(12) United States Patent
Shimizu

(10) Patent No.: US 9,714,696 B2
(45) Date of Patent: Jul. 25, 2017

(54) CARTRIDGE PROVIDED WITH BODY FOR NEW PRODUCT DETECTION

(71) Applicant: Brother Kogyo Kabushiki Kaisha, Nagoya-shi, Aichi-ken (JP)

(72) Inventor: Keita Shimizu, Tsushima (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/316,959

(22) Filed: Jun. 27, 2014

(65) Prior Publication Data

US 2015/0005134 A1 Jan. 1, 2015

(30) Foreign Application Priority Data

Jun. 28, 2013 (JP) ................................. 2013-137422

(51) Int. Cl.
*G03G 15/04* (2006.01)
*F16H 13/04* (2006.01)
*G03G 15/08* (2006.01)

(52) U.S. Cl.
CPC .......... *F16H 13/04* (2013.01); *G03G 15/0863* (2013.01); *G03G 2221/1657* (2013.01)

(58) Field of Classification Search
CPC ....... G03G 15/0863; G03G 2221/1657; G03G 2221/1823; G03G 2221/1892; F16H 13/04
USPC .......................... 399/12, 13, 27, 33, 119, 167
See application file for complete search history.

(56) References Cited

U.S. PATENT DOCUMENTS

| 4,974,020 | A | 11/1990 | Takamatsu et al. |
| 5,053,816 | A | 10/1991 | Takahashi |
| 5,489,976 | A | 2/1996 | Ichikawa |
| 5,495,323 | A | 2/1996 | Meetze, Jr. |
| 5,495,327 | A | 2/1996 | Inomata |
| 5,640,651 | A | 6/1997 | Katoh et al. |
| 5,649,264 | A | 7/1997 | Domon et al. |

(Continued)

FOREIGN PATENT DOCUMENTS

| AU | 2010281279 B2 | 2/2014 |
| CN | 1445624 A | 10/2003 |

(Continued)

OTHER PUBLICATIONS

Co-Pending U.S. Appl. No. 14/316,971, filed Jun. 27, 2014.

(Continued)

*Primary Examiner* — Hoang Ngo
(74) *Attorney, Agent, or Firm* — Banner & Witcoff, Ltd.

(57) ABSTRACT

A cartridge includes a housing, a drive-transmission member and a detected body. The housing has a first wall and a second wall opposing each other in a first direction from the second wall toward the first wall. The drive-transmission member is rotatable about a first axis parallel to the first direction for transmitting a drive force. The detected body is rotatable about a second axis parallel to the first axis upon receipt of the drive force to move the detected body irreversibly from a first position to a second position. The detected body includes: a detected portion; a receiving portion configured to receive the drive force; and a peripheral portion positioned downstream of the receiving portion in a radial direction of the detected body away from the second axis, at least a portion of the detected portion being positioned on the peripheral portion.

13 Claims, 26 Drawing Sheets

(56) References Cited

U.S. PATENT DOCUMENTS

| | | | |
|---|---|---|---|
| 5,970,293 A | 10/1999 | Huang | |
| 6,088,561 A | 7/2000 | Kawamura et al. | |
| 6,154,619 A | 11/2000 | Boockholdt et al. | |
| 6,714,224 B2 | 3/2004 | Yamanaka et al. | |
| 6,792,217 B2 | 9/2004 | Nishino et al. | |
| 6,823,160 B2 | 11/2004 | Okabe | |
| 6,829,465 B2 | 12/2004 | Yamanaka et al. | |
| 6,903,759 B2 | 6/2005 | Yamanaka et al. | |
| 6,909,866 B2 | 6/2005 | Kawai | |
| 6,920,303 B2 | 7/2005 | Yamanaka et al. | |
| 7,116,919 B2 | 10/2006 | Ishii | |
| 7,130,551 B2 | 10/2006 | Kobayashi | |
| 7,418,214 B2 | 8/2008 | Yoshida et al. | |
| 7,463,834 B2 | 12/2008 | Takagi et al. | |
| 7,509,075 B2 | 3/2009 | Hayakawa | |
| 7,512,347 B2 | 3/2009 | Suzuki et al. | |
| 7,536,117 B2 | 5/2009 | Kishi | |
| 7,613,414 B2 | 11/2009 | Kamimura | |
| 7,643,777 B2 | 1/2010 | Matsumoto et al. | |
| 7,756,426 B2 | 7/2010 | Kamimura | |
| 7,933,536 B2 | 4/2011 | Ogawa | |
| 7,953,330 B2 | 5/2011 | Ishikawa | |
| 8,010,026 B2 | 8/2011 | Kobayashi et al. | |
| RE42,796 E | 10/2011 | Ishii | |
| 8,090,272 B2 | 1/2012 | Ishikawa | |
| 8,099,025 B2 | 1/2012 | Ishikake | |
| 8,126,366 B2 | 2/2012 | Hattori | |
| 8,417,130 B2 | 4/2013 | Hashimoto | |
| 8,463,145 B2 | 6/2013 | Ukai et al. | |
| 8,583,009 B2 | 11/2013 | Takagi | |
| 8,600,244 B2 | 12/2013 | Hashimoto | |
| 8,620,180 B2 | 12/2013 | Shiraki et al. | |
| 8,666,293 B2 | 3/2014 | Mushika et al. | |
| 8,744,288 B2 | 6/2014 | Shinoya et al. | |
| 8,761,643 B2 | 6/2014 | Mushika et al. | |
| 8,849,133 B2 | 9/2014 | Itabashi et al. | |
| 8,867,932 B2 | 10/2014 | Ukai et al. | |
| 8,948,617 B2 | 2/2015 | Shiraki et al. | |
| 8,948,661 B2 | 2/2015 | Mushika et al. | |
| 9,195,207 B2 | 11/2015 | Itabashi | |
| 9,207,567 B2 | 12/2015 | Mushika et al. | |
| 2003/0185579 A1 | 10/2003 | Nishino et al. | |
| 2003/0185594 A1 | 10/2003 | Okabe | |
| 2003/0215265 A1 | 11/2003 | Kawai | |
| 2006/0034625 A1 | 2/2006 | Kajikawa | |
| 2006/0104670 A1 | 5/2006 | Nishitani et al. | |
| 2006/0165423 A1 | 7/2006 | Nishitani et al. | |
| 2006/0171737 A1 | 8/2006 | Nishimura et al. | |
| 2006/0193643 A1 | 8/2006 | Takagi et al. | |
| 2006/0193646 A1 | 8/2006 | Suzuki et al. | |
| 2006/0245787 A1 | 11/2006 | Ito et al. | |
| 2007/0031158 A1 | 2/2007 | Kamimura | |
| 2007/0041747 A1 | 2/2007 | Kim et al. | |
| 2007/0059018 A1 | 3/2007 | Tokuda | |
| 2007/0059038 A1 | 3/2007 | Shiraki | |
| 2007/0077101 A1 | 4/2007 | Tamura et al. | |
| 2007/0122165 A1 | 5/2007 | Igarashi et al. | |
| 2007/0140709 A1 | 6/2007 | Yoshida et al. | |
| 2007/0140725 A1 | 6/2007 | Kamimura | |
| 2007/0253748 A1 | 11/2007 | Matsumoto et al. | |
| 2008/0080904 A1 | 4/2008 | Murayama et al. | |
| 2008/0205911 A1 | 8/2008 | Ishikawa et al. | |
| 2008/0205928 A1 | 8/2008 | Ishikawa | |
| 2008/0205931 A1 | 8/2008 | Ishikawa | |
| 2008/0223173 A1 | 9/2008 | Ishikawa | |
| 2008/0317509 A1 | 12/2008 | Mori | |
| 2009/0000423 A1 | 1/2009 | Ishikawa et al. | |
| 2009/0052911 A1 | 2/2009 | Richey et al. | |
| 2009/0084210 A1 | 4/2009 | Tsukada et al. | |
| 2009/0169247 A1 | 7/2009 | Hattori | |
| 2009/0257782 A1 | 10/2009 | Ishikake | |
| 2009/0269085 A1 | 10/2009 | Ukai | |
| 2009/0269086 A1 | 10/2009 | Mikuni | |
| 2009/0285604 A1 | 11/2009 | Nakajima | |
| 2009/0297226 A1 | 12/2009 | Nagashima et al. | |
| 2010/0054763 A1 | 3/2010 | Tomiyori et al. | |
| 2010/0209144 A1 | 8/2010 | Nieda | |
| 2011/0023368 A1 | 2/2011 | Mizutani et al. | |
| 2011/0038649 A1 | 2/2011 | Miyabe et al. | |
| 2011/0081163 A1 | 4/2011 | Lee | |
| 2011/0123231 A1 | 5/2011 | Ozawa et al. | |
| 2011/0236062 A1 | 9/2011 | Takagi | |
| 2011/0236065 A1 | 9/2011 | Takagi | |
| 2011/0236066 A1 | 9/2011 | Takagi | |
| 2011/0243578 A1 | 10/2011 | Ukai et al. | |
| 2012/0014713 A1 | 1/2012 | Murakami et al. | |
| 2012/0051795 A1 | 3/2012 | Mushika et al. | |
| 2012/0057905 A1 | 3/2012 | Itabashi | |
| 2012/0134688 A1 | 5/2012 | Hashimoto | |
| 2012/0148297 A1 | 6/2012 | Peng et al. | |
| 2012/0177398 A1 | 7/2012 | Takigawa | |
| 2012/0243882 A1* | 9/2012 | Carot | 399/12 |
| 2012/0251165 A1 | 10/2012 | Mushika et al. | |
| 2012/0251216 A1 | 10/2012 | Mushika | |
| 2012/0321345 A1 | 12/2012 | Shinoya et al. | |
| 2013/0051813 A1 | 2/2013 | Itabashi et al. | |
| 2013/0051814 A1 | 2/2013 | Itabashi et al. | |
| 2013/0051815 A1 | 2/2013 | Itabashi et al. | |
| 2013/0051816 A1* | 2/2013 | Itabashi | G03G 21/1652 399/12 |
| 2013/0051833 A1 | 2/2013 | Itabashi et al. | |
| 2013/0084083 A1 | 4/2013 | Itabashi et al. | |
| 2013/0136460 A1 | 5/2013 | Shiraki et al. | |
| 2013/0170844 A1 | 7/2013 | Itabashi | |
| 2013/0170845 A1 | 7/2013 | Itabashi | |
| 2013/0259528 A1 | 10/2013 | Yamamoto | |
| 2013/0272724 A1 | 10/2013 | Ukai et al. | |
| 2014/0020489 A1 | 1/2014 | Nozaki et al. | |
| 2014/0086638 A1 | 3/2014 | Sato | |
| 2014/0169835 A1 | 6/2014 | Nakajima | |
| 2014/0219690 A1 | 8/2014 | Li et al. | |
| 2014/0294403 A1 | 10/2014 | Shimizu | |
| 2014/0341617 A1 | 11/2014 | Mushika et al. | |
| 2014/0363189 A1 | 12/2014 | Hashimoto et al. | |
| 2014/0376968 A1 | 12/2014 | Yamamoto et al. | |
| 2015/0000443 A1 | 1/2015 | Shimizu | |
| 2015/0003844 A1 | 1/2015 | Ukai et al. | |
| 2015/0005134 A1 | 1/2015 | Shimizu | |
| 2015/0010334 A1 | 1/2015 | Nakajima | |
| 2015/0037071 A1 | 2/2015 | Yamamoto | |
| 2015/0043944 A1 | 2/2015 | Yamamoto | |
| 2015/0104222 A1 | 4/2015 | Mushika et al. | |
| 2015/0117873 A1 | 4/2015 | Mori et al. | |
| 2015/0117906 A1 | 4/2015 | Mori | |
| 2015/0153675 A1 | 6/2015 | Itabashi et al. | |

FOREIGN PATENT DOCUMENTS

| | | |
|---|---|---|
| CN | 1828447 A | 9/2006 |
| CN | 1288515 C | 12/2006 |
| CN | 2884266 Y | 3/2007 |
| CN | 1983078 A | 6/2007 |
| CN | 101063855 A | 10/2007 |
| CN | 200962188 Y | 10/2007 |
| CN | 101256379 A | 9/2008 |
| CN | 101295157 A | 10/2008 |
| CN | 201170840 Y | 12/2008 |
| CN | 100476636 C | 4/2009 |
| CN | 201222170 Y | 4/2009 |
| CN | 101625537 B | 1/2010 |
| CN | 201402371 Y | 2/2010 |
| CN | 201464807 U | 5/2010 |
| CN | 201489284 U | 5/2010 |
| CN | 202102251 U | 1/2012 |
| CN | 202472249 U | 10/2012 |
| CN | 102799090 A | 11/2012 |
| CN | 202649679 U | 1/2013 |
| CN | 203673223 U | 6/2014 |
| EP | 0838733 A2 | 4/1998 |
| EP | 1696278 A2 | 8/2006 |
| EP | 1696278 A3 | 8/2006 |
| EP | 1965268 A1 | 9/2008 |
| EP | 1965274 A2 | 9/2008 |
| EP | 1995644 A2 | 11/2008 |

(56) References Cited

FOREIGN PATENT DOCUMENTS

| | | |
|---|---|---|
| EP | 2093619 A1 | 8/2009 |
| EP | 2369422 A1 | 9/2011 |
| EP | 2 378 378 | 10/2011 |
| EP | 2463723 A1 | 6/2012 |
| EP | 2463723 A4 | 6/2012 |
| EP | 2574991 A2 | 4/2013 |
| EP | 2574992 A2 | 4/2013 |
| EP | 2574993 A2 | 4/2013 |
| HK | 1090991 A1 | 11/2009 |
| JP | S5323696 | 2/1978 |
| JP | S6183570 A | 4/1986 |
| JP | S63-118042 U | 7/1988 |
| JP | H01205175 A | 8/1989 |
| JP | H02-78949 U | 6/1990 |
| JP | H02-262168 A | 10/1990 |
| JP | H03-212656 A | 9/1991 |
| JP | H04-31156 A | 2/1992 |
| JP | H04-31156 U | 3/1992 |
| JP | H04-191773 A | 7/1992 |
| JP | H04-112263 U | 9/1992 |
| JP | H04-114057 U | 10/1992 |
| JP | 5323696 B2 | 12/1993 |
| JP | 06-208301 A | 7/1994 |
| JP | H07-140776 A | 6/1995 |
| JP | H07-281519 | 10/1995 |
| JP | H08-179608 A | 7/1996 |
| JP | H08-248838 A | 9/1996 |
| JP | H09160466 A | 6/1997 |
| JP | H09222783 A | 8/1997 |
| JP | 2551714 Y2 | 10/1997 |
| JP | H09-258634 A | 10/1997 |
| JP | H10-301382 A | 11/1998 |
| JP | H11-37169 A | 2/1999 |
| JP | H11-52716 A | 2/1999 |
| JP | 2000338760 A | 12/2000 |
| JP | 2001-042585 A | 2/2001 |
| JP | 2001-166648 A | 6/2001 |
| JP | 3266779 B2 | 3/2002 |
| JP | 2002-169449 A | 6/2002 |
| JP | 2003-271039 A | 9/2003 |
| JP | 2003295614 A | 10/2003 |
| JP | 2003-337504 A | 11/2003 |
| JP | 2004-045603 B2 | 2/2004 |
| JP | 2005-241942 A | 9/2005 |
| JP | 3710375 B2 | 10/2005 |
| JP | 2006-235236 A | 9/2006 |
| JP | 2006-243072 A | 9/2006 |
| JP | 2006-267994 A | 10/2006 |
| JP | 2007-079284 A | 3/2007 |
| JP | 2007-164095 A | 6/2007 |
| JP | 2007-199514 A | 8/2007 |
| JP | 2008-089731 A | 4/2008 |
| JP | 2008-216391 A | 9/2008 |
| JP | 2008-216392 A | 9/2008 |
| JP | 2008-216393 A | 9/2008 |
| JP | 2008-216394 A | 9/2008 |
| JP | 2008216919 A | 9/2008 |
| JP | 2008299123 A | 12/2008 |
| JP | 2008299124 A | 12/2008 |
| JP | 2008299125 A | 12/2008 |
| JP | 2009069177 A | 4/2009 |
| JP | 2009-162915 A | 7/2009 |
| JP | 2009-180983 A | 8/2009 |
| JP | 4310703 B2 | 8/2009 |
| JP | 2009-223017 A | 10/2009 |
| JP | 2009-244560 A | 10/2009 |
| JP | 2009244563 A | 10/2009 |
| JP | 2009-276727 A | 11/2009 |
| JP | 4372703 B2 | 11/2009 |
| JP | 2009-282099 A | 12/2009 |
| JP | 2009-288549 A | 12/2009 |
| JP | 4376861 B2 | 12/2009 |
| JP | 2011-013323 A | 1/2011 |
| JP | 3167011 U | 3/2011 |
| JP | 2011-215374 A | 10/2011 |
| JP | 4859139 B2 | 1/2012 |
| JP | 2012-053095 A | 3/2012 |
| JP | 2012-108537 A | 6/2012 |
| JP | 2012-194318 A | 10/2012 |
| JP | 2012-212086 A | 11/2012 |
| JP | 2012-233941 A | 11/2012 |
| JP | 2013-011911 A | 1/2013 |
| JP | 2013501253 A | 1/2013 |
| JP | 2013054063 A | 3/2013 |
| RU | 2011138921 A | 9/2013 |
| WO | 2007062588 A1 | 6/2007 |
| WO | 2011/015051 A1 | 2/2011 |
| WO | 2013040989 A1 | 3/2013 |
| WO | 2013073134 A1 | 5/2013 |

OTHER PUBLICATIONS

Aug. 21, 2015 (EP) Extended EP Search Report—App. No. 15161258.7.
Aug. 20, 2015—(EP) Extended EP Search Report in App No. 15161221.5.
May 8, 2015—(US) *Ex Parte Quayle*—U.S. Appl. No. 14/316,971.
Feb. 27, 2014—(KR) Notice of Preliminary Rejection—App 10-2012-7028457.
Machine translation of JP 2006-235236 dated Jan. 9, 2014.
Jan. 5, 2012—(JP) Decision of Patent Grant—App 2010-083408.
Apr. 26, 2011—(WO) International Search Report (JPO)—App PCT/JP2011/057946.
Nov. 12, 2014—(US) Non-Final Office Action—U.S. Appl. No. 14/485,462.
Dec. 31, 2014—(CN) Notification of First Office Action—App 201310175410.5, Eng Tran.
Mar. 20, 2015—(US) Final Office Action—U.S. Appl. No. 14/485,462.
Mar. 27, 2015—(US) Co-Pending U.S. Appl. No. 14/670,502.
Mar. 27, 2015—(US) Co-pending U.S. Appl. No. 14/670,676.
Decision to Grant a Patent issued in corresponding Japanese Patent Application No. 2010-193204 dated Sep. 18, 2012.
Notice of Reasons for Rejection issued in Japanese Patent Application No. 2012-229560 mailed Feb. 19, 2013.
Machine translation of JP 07-281519A dated May 2, 2013.
Machine translation of JP 10-031382A dated May 1, 2013.
Notice of Allowance received in U.S. Appl. No. 13/222,096 mailed Oct. 16, 2013.
Office Action received in related Chinese Patent Application No. 201110251898.6 mailed Oct. 15, 2013.
Notification of the First Office Action with Search Report issued in corresponding Chinese Patent Application No. 201110251898.6 dated Dec. 11, 2012.
Notice of Reasons for Rejection issued in corresponding Japanese Patent Application 2010-193204 mailed Jun. 26, 2012.
Notice of Allowance issued in corresponding U.S. Appl. No. 14/154,521 mailed Feb. 10, 2014.
Sep. 19, 2014—(US) Notice of Allowance—U.S. Appl. No. 14/275,251.
Mar. 19, 2015—(US) Non-Final Office Action—U.S. Appl. No. 14/577,396.
Mar. 3, 2015—(CN) Notification of First Office Action—App 201310175264.6, Eng Tran.
Mar. 3, 2015—(CN) Notification of First Office Action—App 201310175229.4, Eng Tran.
Apr. 14, 2014 (US) Non-Final Office Action in U.S. Appl. No. 13/628,492.
Sep. 23, 2014—(US) Notice of Allowance—U.S. Appl. No. 13/628,492.
Apr. 15, 2015—(US) Notice of Allowance—U.S. Appl. No. 14/529,221.
Aug. 4, 2015—(US) Notice of Allowance—U.S. Appl. No. 14/577,396.
Aug. 25, 2015—(US) Non-Final Office Action—U.S. Appl. No. 14/671,413.
Jul. 22, 2015—(US) Non-Final Office Action—U.S. Appl. No. 14/316,971.

(56) References Cited

OTHER PUBLICATIONS

May 18, 2015—(US) Non-Final Office Action—U.S. Appl. No. 14/611,393.
Oct. 5, 2015—(US) Non-Final Office Action—U.S. Appl. No. 14/670,801.
Sep. 17, 2015—(EP) Office Action—App 11179283.4.
Sep. 17, 2015—(US) Non-Final Office Action—U.S. Appl. No. 14/670,489.
Sep. 23, 2015—(US) Notice of Allowance—U.S. Appl. No. 14/529,221.
Sep. 30, 2015—(US) Non-Final Office Action—U.S. Appl. No. 14/670,522.
Sep. 16, 2015—(US) Notice of Allowance—U.S. Appl. No. 14/485,462.
Apr. 21, 2015 (EP) Extended European Search Report Received in European Application No. 14173865.8.
Sep. 30, 2013—(CN) Office Action—App 201210083716.3.
Feb. 19, 2014—(US) Notice of Allowance—U.S. Appl. No. 13/431,074.
Jan. 8, 2014—(US) Notice of Allowance—U.S. Appl. No. 13/430,950.
Mar. 27, 2014—(US) Notice of Allowance—U.S. Appl. No. 13/431,077.
Oct. 7, 2014—(US) Notice of Allowance—U.S. Appl. No. 14/290,188.
Aug. 19, 2015—(US) Non-Final Office Action—U.S. Appl. No. 14/589,696.
Dec. 14, 2015—(US) Non-Final Office Action—U.S. Appl. No. 14/926,345.
Dec. 17, 2015—(US) Non-Final Office Action—U.S. Appl. No. 14/670,676.
Dec. 24, 2015—(US) Notice of Allowance—U.S. Appl. No. 14/491,157.
Feb. 4, 2015—(US) Notice of Allowance—U.S. Appl. No. 14/289,780.
Jan. 20, 2015 —(JP) Notification of Reasons for Refusal—App 2014-042421, Eng Tran.
May 1, 2015—(US) Non-Final Office Action—U.S. Appl. No. 14/491,157.
Nov. 27, 2015—(US) Non-Final Office Action—U.S. Appl. No. 14/670,502.
Oct. 19, 2015—(US) Non-Final Office Action—U.S. Appl. No. 14/611,393.
Sep. 17, 2015—(EP) Office Action—U.S. Appl. No. 11160291.8.
Jan. 20, 2016—(US) Notice of Allowance—U.S. Appl. No. 14/316,971.
Jan. 21, 2016—(US) Notice of Allowance—U.S. Appl. No. 14/485,462.
CN Office Action mailed Sep. 30, 2013, CN App. 201210083716.3, English translation.
European Search Report against European Applicaion No. 12157690.4 sent from European Patent Office in Jul. 16, 2012.
Extended EP Search Report mailed May 27, 2014, EP App. 12161226.1.
First Office Action with Search Report issued in corresponding Chinese Patent Application No. 201210083604.8 mailed Sep. 6, 2013.
JP Office Action mailed Nov. 19, 2013, JP Appln. 2013-103770, English translation.
Non-Final Office Action received in corresponding U.S. Appl. No. 14/290,188 mailed Jun. 19, 2014.
Non-final Office Action received in U.S. Appl. No. 13/431,077 mailed Sep. 16, 2013.
Jul. 11, 2016—(US) Non-Final Office Action—U.S. Appl. No. 14/670,502.
Feb. 2, 2016—(US) Notice of Allowance—U.S. Appl. No. 14/670,516.
Feb. 17, 2016—(US) Notice of Allowance—U.S. Appl. No. 14/671,413.
Feb. 18, 2016—(US) Notice of Allowance—U.S. Appl. No. 14/529,221.
Mar. 4, 2016—(US) Notice of Allowance—U.S. Appl. No. 14/491,157.
Mar. 29, 2016—(US) Notice of Allowance—U.S. Appl. No. 14/485,462.
Apr. 1, 2016—(US) Notice of Allowance—U.S. Appl. No. 14/926,345.
Apr. 12, 2016—(US) Notice of Allowance—U.S. Appl. No. 14/611,393.
Apr. 14, 2016—(US) Notice of Allowance—U.S. Appl. No. 14/670,522.
Feb. 8, 2016—(EP) Extended European Search Report—App 15161221.5.
Sep. 23, 2015—(EP) Extended European Search Report—App 151612211.
Sep. 23, 2015—(EP) Extended European Search Report—App 15161224.9.
Sep. 25, 2015—(EP) Extended European Search Report—App 15161229.8.
Sep. 29, 2015—(EP) Extended European Search Report—App 15161242.1.
Apr. 26, 2016—(US) Non-Final Office Action—U.S. Appl. No. 15/079,829.
May 9, 2016—(US) Notice of Allowance—U.S. Appl. No. 14/670,489.
May 24, 2016—(US) Notice of Allowance—U.S. Appl. No. 14/485,462.
May 27, 2016—(US) Notice of Allowance—U.S. Appl. No. 14/671,413.
Jun. 24, 2016—(US) Notice of Allowance—U.S. Appl. No. 14/316,971.
Jun. 17, 2016—(US) Notice of Allowance—U.S. Appl. No. 14/485,462.
Jun. 22, 2016—(US) Notice of Allowance—U.S. Appl. No. 14/485,462.
May 24, 2016—(EP) Communication—App 12157679.7.
Sep. 24, 2016—(EP) Communication—App 12157679.7.
May 24, 2016—(EP) Communication—App 12157690.4.
Sep. 11, 2015—(EP) Communication—App 12157690.4.
Jul. 16, 2012—(EP) Search Report 12157679.7.
Jun. 22, 2016—(US) Notice of Allowance—U.S. Appl. No. 14/529,221.
Apr. 16, 2013 (JP) Notice of Allowance—App. 2011100507.
Feb. 17, 2015 (JP) Notice of Allowance—App. 2011078637.
May 11, 2016—(EP) Communication—App 12161226.1.
Jun. 29, 2016—(US) Notice of Allowance—U.S. Appl. No. 14/611,393.
Jul. 14, 2016—(US) Notice of Allowance—U.S. Appl. No. 14/670,676.
Jul. 15, 2016—(US) Notice of Allowance—U.S. Appl. No. 14/670,522.
Aug. 1, 2016—(US) Notice of Allowance—U.S. Appl. No. 14/670,516.
Sep. 28, 2016—(US) Notice of Allowance—U.S. Appl. No. 14/670,801.
Aug. 9, 2016—(US) Notice of Allowance—U.S. Appl. No. 15/079,829.
Sep. 12, 2016—(US) Notice of Allowance—U.S. Appl. No. 14/589,696.
Nov. 22, 2016—(JP) Office Action—App 2013137422—Eng Tran.
Dec. 13, 2016—(JP) Office Action—App 2014000609—Eng Tran.
Dec. 13, 2016—(JP) Office Action—App 2013137425—Eng Tran.
Dec. 12, 2016—(JP) Office Action—App 2014074727—Eng Tran.
Dec. 27, 2016—(JP) Office Action—App 2014074728—Eng Tran.
Dec. 27, 2016—(JP) Office Action—App 2014074729—Eng Tran.
Dec. 27, 2016—(JP) Office Action—App 2014074730—Eng Tran.
May 23, 2017 —(JP) Decision of Rejection—App 2014-074731—Eng Tran.

* cited by examiner

CARTRIDGE PROVIDED WITH BODY FOR NEW PRODUCT DETECTION

CROSS REFERENCE TO RELATED APPLICATION

This application claims priority from Japanese Patent Application No. 2013-137422 filed Jun. 28, 2013. The entire content of the priority application is incorporated herein by reference.

TECHNICAL FIELD

The present invention relates to a cartridge mountable in an image forming apparatus employing an electrophotographic system.

BACKGROUND

An electrophotographic printer having a developing cartridge detachably mounted therein is well known in the art. Conventionally, this type of printer is provided with a sensor for detecting whether a mounted developing cartridge is a new product.

As one example of such printers, Japanese Patent Application Publication No. 2011-215374 discloses a laser printer including a main casing and a developing cartridge. The main casing is provided with an actuator and an optical sensor. The developing cartridge includes a detected rotary body and an agitator gear. The detected rotary body is provided with a disc-shaped sector gear part having gear teeth along a portion of its circumferential surface, and a detected part erecting on a left endface of the sector gear part. The agitator gear is provided with a large-diameter gear part configured to receive a drive force, and a small-diameter gear part configured to intermesh with the gear teeth of the sector gear part of the detected rotary body.

In this conventional laser printer, a drive force is transmitted to the detected rotary body via the agitator gear. Upon receipt of the drive force, the detected rotary body is rotated so that the detected part is brought into abutment with the actuator to pivotally move the same. Upon detection of the pivotal movement of the actuator by the optical sensor, the laser printer can determine information on the developing cartridge.

SUMMARY

Recently, a demand of downsizing of cartridges is increased more than ever. However, downsizing of the above-described developing cartridge could result in downsizing of the detected rotary body and reduction in a diameter of the disc-shaped sector gear part. Accordingly, because the detected part upstands on the left endface of the sector gear part, an amount of displacement of the detected part in accordance with the rotation of the detected rotary body is also decreased.

Under such circumstances, long stroke pivotal movement of the actuator cannot be provided and detection of the pivotal movement of the actuator by the optical sensor becomes difficult in spite of abutment of the detected part onto the actuator. As a result, detection accuracy for determining information of the developing cartridge would be lowered in the laser printer.

In view of the foregoing, it is an object of the present invention to provide a cartridge capable of enhancing detection accuracy irrespective of downsizing of the cartridge.

In order to attain the above and other objects, there is provided a cartridge including a housing, a drive-transmission member and a detected body. The housing is configured to accommodate developer therein and has a first wall and a second wall opposing each other in a first direction defined as a direction from the second wall toward the first wall. The drive-transmission member is configured to rotate about a first axis parallel to the first direction for transmitting a drive force. The detected body is configured to rotate about a second axis parallel to the first axis upon receipt of the drive force from the drive-transmission member to move the detected body irreversibly from a first position to a second position. The detected body includes: a detected portion; a receiving portion configured to receive the drive force from the drive-transmission member; and a peripheral portion positioned downstream of the receiving part in a radial direction of the detected body away from the second axis, at least a portion of the detected portion being positioned on the peripheral portion.

Here, the "radial direction of the detected body away from the second axis" means not only a radial direction of the detected body away from the second axis if the rotatable detected body has a circular side view, but also a direction from the second axis (rotational center) toward an outermost peripheral end of the detected body if the detected body is a rotatable body having a shape other than a circular shape in a side view.

DETAILED DESCRIPTION

1. Overview of a Developing Cartridge

Figure 1:
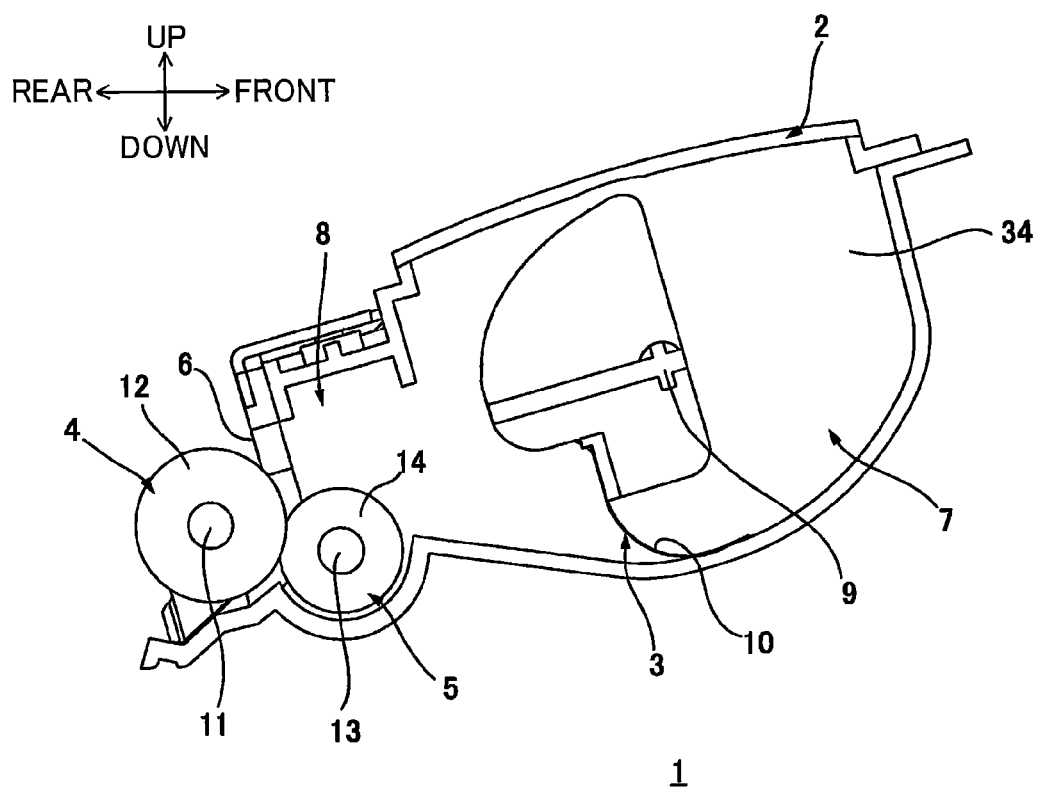
FIG. 1 is a center cross-sectional view of a developing cartridge according to a first embodiment of the present invention.

First, a developing cartridge 1 serving as an example of a cartridge according to a first embodiment of the present invention will be described with reference to FIG. 1. As shown in FIG. 1, the developing cartridge 1 includes a housing 2, an agitator 3, a developing roller 4, a supply roller 5, and a thickness-regulating blade 6.

In the following description, the side of the developing cartridge 1 in which the developing roller 4 is provided will be considered the rear, while the opposite side will be considered the front. Further, left and right sides of the developing cartridge 1 will be defined based on the perspective of a user looking at the developing cartridge 1 from the front. Specifically, directions related to the developing cartridge 1 in the following description will correspond to arrows shown in the drawings. Thus, the left side of FIG. 1 is the rear, the right side is the front, the near side the left side, and the far side is the right side. As noted in FIG. 3, the direction from the right end toward the left end of the developing cartridge 1 is called a first direction X while the opposite direction, i.e., the direction from the left end to the right end is called a second direction Y. In the following description, "outward in a radial direction" refers to a direction away from the central axis of a member in a radial direction of that member, while "inward in a radial direction" refers to a direction toward the central axis of a member in the radial direction of that member.

As shown in FIG. 1, the housing 2 has a box-like shape that is elongated in a left-right direction. An opening is formed in the rear side of the housing 2 and penetrates the rear side in a front-rear direction. The interior of the housing 2 includes a toner-accommodating chamber 7 and a developing chamber 8 formed adjacent to each other in the front-rear direction. The toner-accommodating chamber 7 functions to accommodate toner as an example of a developer.

The agitator 3 is disposed in an approximate front-rear and vertical center region of the toner-accommodating chamber 7. The agitator 3 includes an agitator shaft 9, and an agitating blade 10. The agitator shaft 9 has a general columnar shape that extends in the left-right direction. The agitating blade 10 extends outward from the agitator shaft 9 in a radial direction of the agitator shaft 9.

Figure 5:
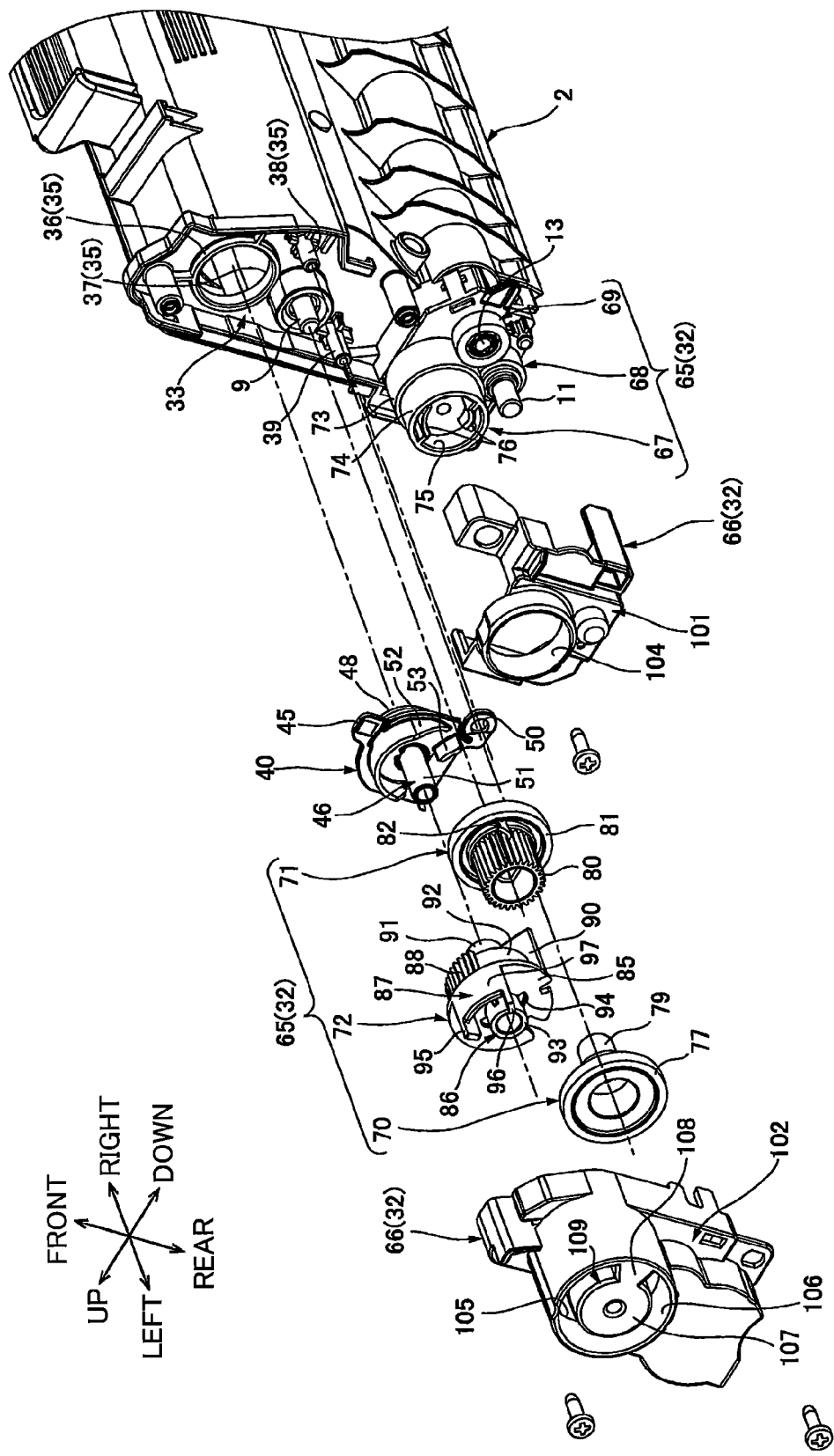
FIG. 5 is an exploded perspective view of the sensor unit according to the first embodiment shown in FIG. 3 from the lower left side thereof, the sensor unit including a sensor gear and an agitator gear.

The agitator 3 is rotatably supported in the housing 2. Specifically, left and right ends of the agitator shaft 9 are rotatably supported respectively by a left wall 33 and a right wall 34 of the housing 2 described later. The left end of the agitator shaft 9 protrudes leftward from the left wall 33, as shown in FIG. 5.

As shown in FIG. 1, the developing roller 4 is disposed in a rear end portion of the developing chamber 8. The developing roller 4 includes a developing-roller shaft 11, and a rubber roller 12. The developing-roller shaft 11 has a general columnar shape that extends in the left-right direction. The rubber roller 12 covers the developing-roller shaft 11 such that left and right end portions of the developing-roller shaft 11 are exposed. Upper and rear portions of the rubber roller 12 are exposed outside the housing 2. The developing roller 4 is rotatably supported in the housing 2 by left and right ends of the developing-roller shaft 11 being rotatably supported to the left wall 33 and right wall 34. As shown in FIG. 5, the left end of the developing-roller shaft 11 protrudes leftward from the left wall 33.

As shown in FIG. 1, the supply roller 5 is disposed in the developing chamber 8 on the lower front side of the developing roller 4. The supply roller 5 includes a supply-roller shaft 13, and a sponge roller 14. The supply-roller shaft 13 has a general columnar shape that extends in the left-right direction. The sponge roller 14 covers the supply-roller shaft 13 while leaving left and right ends of the supply-roller shaft 13 exposed. An upper rear surface of the sponge roller 14 contacts a lower front surface of the rubber roller 12 with pressure. The supply roller 5 is rotatably supported in the housing 2. Specifically, left and right ends of the supply-roller shaft 13 are rotatably supporting by the left wall 33 and the right wall 34. As shown in FIG. 5, the left end of the supply-roller shaft 13 protrudes leftward from the left wall 33.

The thickness-regulating blade 6 is disposed in the developing chamber 8 on the upper front side of the developing roller 4. The thickness-regulating blade 6 has a plate shape that is generally rectangular in a rear view and is elongated in the left-right direction. The thickness-regulating blade 6 extends vertically in a side view. The thickness-regulating blade 6 is supported in the housing 2 such that a bottom edge of the thickness-regulating blade 6 contacts an upper front surface of the developing roller 4.

2. General Structure of a Printer

Figure 2:
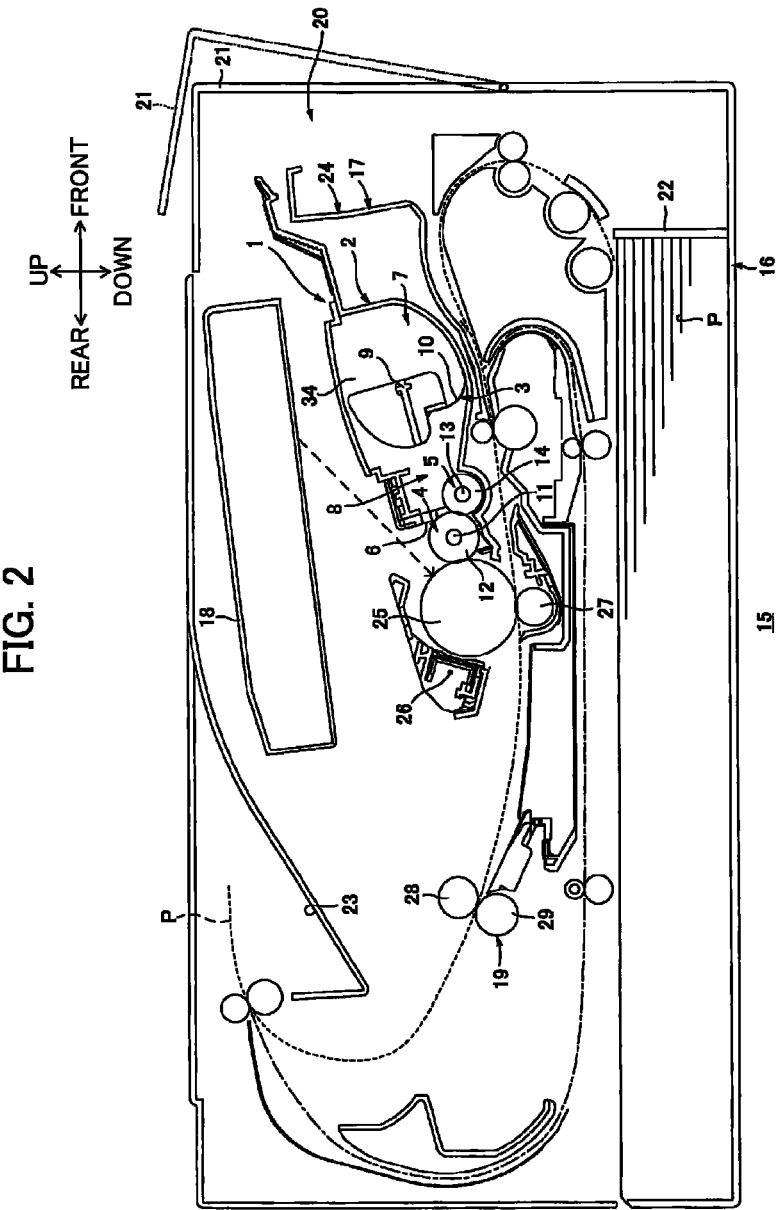
FIG. 2 is a center cross-sectional view of a printer provided with the developing cartridge according to the first embodiment.

FIG. 2 shows a monochrome printer 15 employing an electrophotographic system. The printer 15 includes a main casing 16, a process cartridge 17, a scanning unit 18, and a fixing unit 19.

The main casing 16 has a box-like shape and includes an access opening 20, a front cover 21, a paper tray 22, and a discharge tray 23.

The access opening 20 is formed in a front wall of the main casing 16 and penetrates the front wall in the front-rear direction. The access opening 20 allows passage of the process cartridge 17 into and out of the main casing 16.

The front cover 21 has a plate shape bent in a general L-shape in a side view. The front cover 21 is pivotally movably supported on the front wall of the main casing 16 about its bottom edge in order to expose or cover the access opening 20.

The paper tray 22 is disposed in a bottom section of the main casing 16. The paper tray 22 functions to accommodate sheets P of paper.

The discharge tray 23 is provided on a top surface of the main casing 16.

The process cartridge 17 can be mounted into or removed from the main casing 16 through the access opening 20. The process cartridge 17 includes a drum cartridge 24, and the above-described developing cartridge 1.

The drum cartridge 24 includes a photosensitive drum 25, a scorotron charger 26, and a transfer roller 27.

The photosensitive drum 25 is disposed in a rear end portion of the drum cartridge 24. The photosensitive drum 25 has a general cylindrical shape that extends in the left-right direction. The photosensitive drum 25 is rotatably supported to a frame of the drum cartridge 24.

The scorotron charger 26 is disposed to the rear of the photosensitive drum 25 and is separated from the photosensitive drum 25.

The transfer roller 27 is disposed below the photosensitive drum 25 and contacts a bottom surface of the same.

The developing cartridge 1 can be mounted in and removed from the drum cartridge 24. When the developing cartridge 1 is mounted in the drum cartridge 24, a rear surface of the developing roller 4 is in contact with a front surface of the photosensitive drum 25.

The scanning unit 18 is disposed above the process cartridge 17. The scanning unit 18 is configured to irradiate a laser beam toward the photosensitive drum 25, as indicated by a dashed line in FIG. 1, based on image data.

The fixing unit 19 is disposed rearward of the process cartridge 17. The fixing unit 19 includes a heating roller 28, and a pressure roller 29. The pressure roller 29 is disposed on the lower rear side of the heating roller 28 and contacts a lower rear surface of the heating roller 28 with pressure.

The printer 15 performs an image-forming operation under control of a control unit (not shown). At the beginning of this image-forming operation, the scorotron charger 26 applies a uniform charge to the surface of the photosensitive drum 25. Next, the scanning unit 18 exposes the surface of the photosensitive drum 25 to light by the laser beam, forming an electrostatic latent image on the surface of the photosensitive drum 25 based on image data.

The agitator 3 agitates toner in the toner-accommodating chamber 7 and supplies the agitated toner to the supply roller 5. The supply roller 5 supplies the toner received from the agitator 3 to the developing roller 4. At this time, the toner is positively tribocharged between the developing roller 4 and supply roller 5 while being transferred to the surface of the developing roller 4. The thickness-regulating blade 6 regulates the toner carried on the surface of the developing roller 4 at a uniform thickness.

The developing roller 4 supplies toner at this uniform thickness to the electrostatic latent image formed on the surface of the photosensitive drum 25 so that the photosensitive drum 25 now carries a toner image on its surface.

Through the rotation of various rollers provided in the printer 15, sheets P are supplied one at a time and at a prescribed timing from the paper tray 22 to a position between the photosensitive drum 25 and transfer roller 27. The toner image carried on the photosensitive drum 25 is transferred onto the sheet P as the sheet P passes between the photosensitive drum 25 and transfer roller 27.

Next, the sheet P passes between the heating roller 28 and pressure roller 29, which apply heat and pressure to the sheet P for thermally fixing the toner image to the sheet P. Subsequently, the sheet P is discharged onto the discharge tray 23.

3. Detailed Description of the Developing Cartridge

Figure 3:
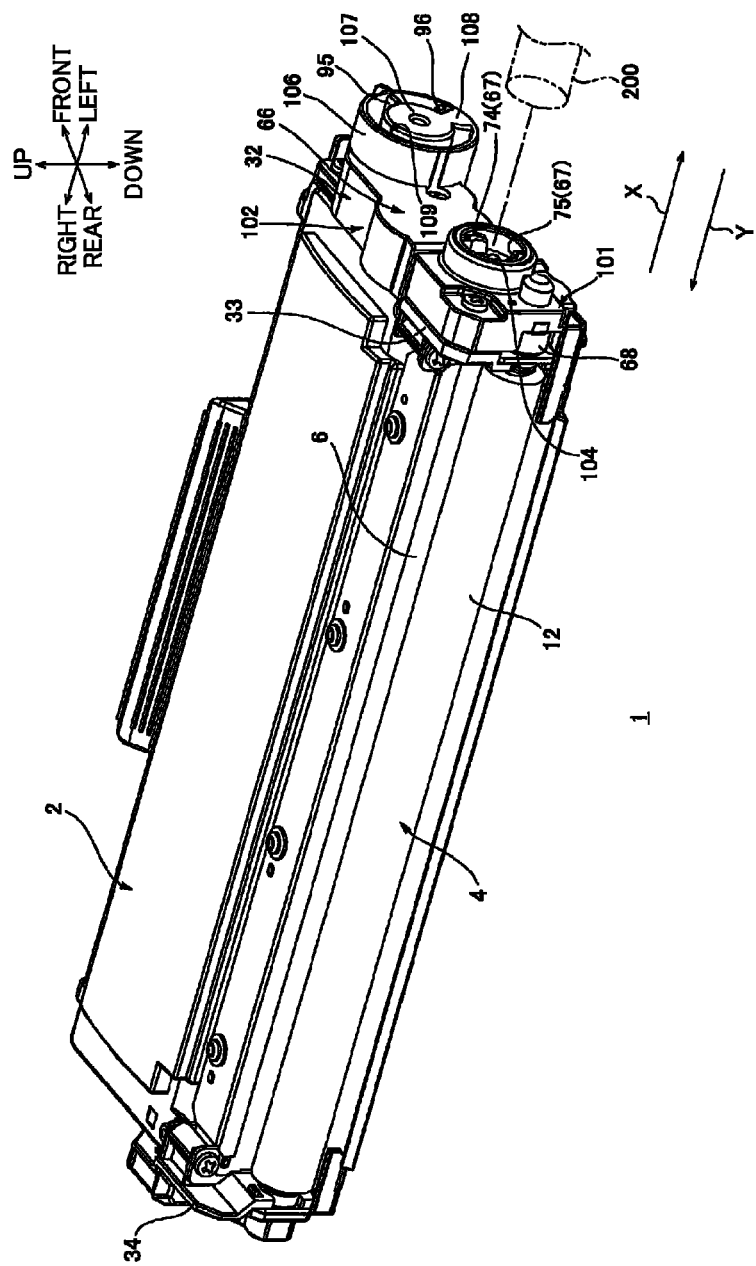
FIG. 3 is a perspective view of the developing cartridge according to the first embodiment from the upper left side thereof, the developing cartridge including a sensor unit.

As shown in FIG. 3, the developing cartridge 1 is provided with a sensor unit 32. The sensor unit 32 is disposed on a left end of the housing 2.

(1) Housing

The housing 2 includes the left wall 33 and the right wall 34. The left wall 33 and right wall 34 are examples of a first wall and a second wall, respectively. The left wall 33 is provided on the left side of the housing 2 and is separated from the right wall 34 provided on the right side of the housing 2. In other words, the left wall 33 is separated from the right wall 34 in the first direction X (i.e., leftward).

Each of the left wall 33 and right wall 34 has a plate shape that is generally rectangular in a side view and elongated in the front-rear direction.

As shown in FIG. 5, the left wall 33 includes an idle-gear support shaft 39, a cap support part 35, and a cap 40.

The idle-gear support shaft 39 is disposed in an approximate front-rear center region on a left surface of the left wall 33 and at a position obliquely above and rearward from the left end portion of the agitator shaft 9 that protrudes out from the left wall 33. The idle-gear support shaft 39 has a general columnar shape that is elongated in the left-right direction and protrudes leftward from the left surface of the left wall 33.

The cap support part 35 is disposed on a front end portion of the left wall 33. The cap support part 35 includes a toner fill hole 37, a collar 36, and a positioning part 38.

The toner fill hole 37 has a general circular shape in a side view and penetrates the front end portion of the left wall 33 in the left-right direction. Thus, the toner fill hole 37 provides communication between the toner-accommodating chamber 7 and the exterior of the housing 2 in the left-right direction. The collar 36 has a general cylindrical shape and protrudes leftward from a peripheral edge of the toner fill hole 37. The positioning part 38 is positioned apart from the collar 36 in a direction obliquely downward and rearward therefrom. The positioning part 38 has a general columnar shape that is elongated in the left-right direction. The positioning part 38 protrudes leftward from the left surface of the left wall 33.

Figure 4:
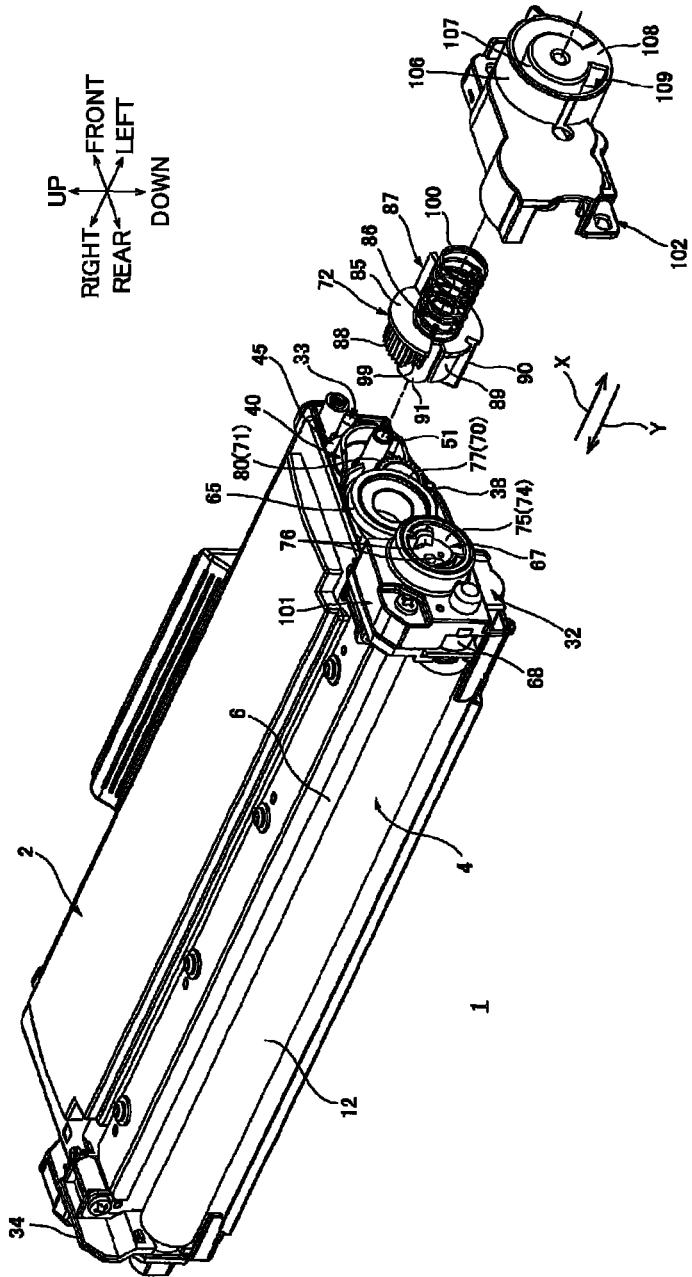
FIG. 4 is a perspective view of the sensor unit according to the first embodiment shown in FIG. 3 from the upper left side thereof.
Figure 7:
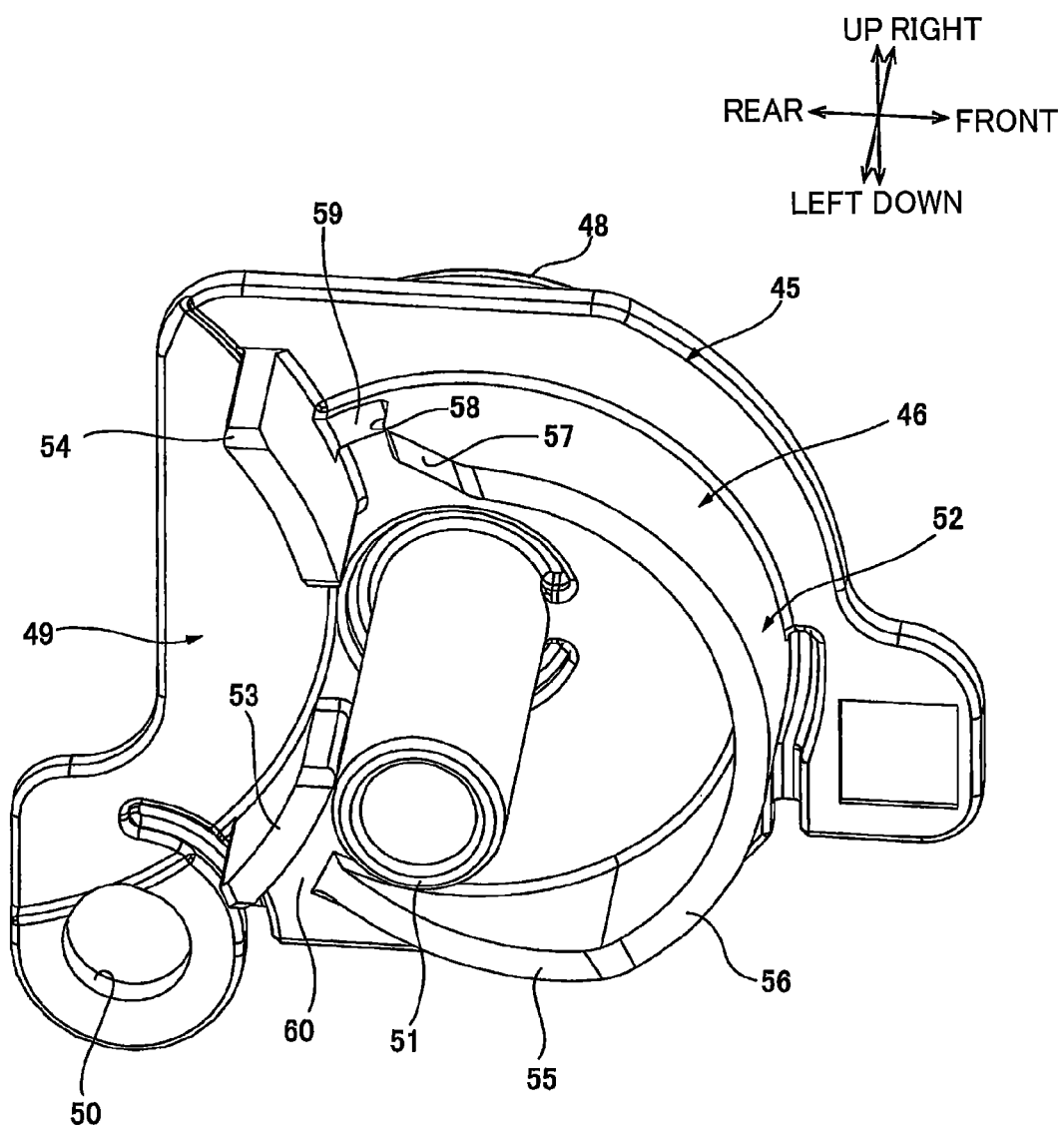
FIG. 7 is a perspective view of a cap shown in FIG. 3 from the upper left side thereof.

As shown in FIG. 4, the cap 40 can be mounted in and detached from the toner fill hole 37 and collar 36. As shown in FIG. 7, the cap 40 integrally includes a closing part 45, an insertion part 48, and a sensor-gear support part 46.

The closing part 45 has a plate shape that is generally rectangular in a side view. The closing part 45 further includes a recessed part 49, and a positioning hole 50.

The recessed part 49 is formed in a rear edge portion of the closing part 45 and is recessed in a left surface thereof. The recessed part 49 is formed in a position that overlaps in the left-right direction a front end of a second gear part 81 constituting an agitator gear 71 described later. The recessed part 49 has a general arc shape in a side view so as to follow a circumferential surface of the second gear part 81. The recessed part 49 is recessed to a position rightward from the left surface of the closing part 45. The recessed part 49 is open on the rear side. That is, the recessed part 49 is recessed rightward so as to separate from the front end of the second gear part 81 on the right side thereof.

The positioning hole 50 is formed in a lower rear end portion of the closing part 45. The positioning hole 50 has a general circular shape in a side view and penetrates the closing part 45 in the left-right direction.

The insertion part 48 is disposed on a right surface of the closing part 45. As shown in FIG. 5, the insertion part 48 has a general cylindrical shape that extends in the left-right direction. The insertion part 48 protrudes rightward from the right surface of the closing part 45. The insertion part 48 has an outer diameter slightly smaller than an inner diameter of the toner fill hole 37.

As shown in FIG. 7, the sensor-gear support part 46 is disposed on the left surface of the closing part 45. The sensor-gear support part 46 includes a sensor-gear support shaft 51, a guide part 52, a first stopper 53, a second stopper 54, and a protruding part 59. The first stopper 53 and second stopper 54 are examples of a first restricting portion and a second restricting portion, respectively, and the protruding part 59 is an example of a second contact portion.

The sensor-gear support shaft 51 is disposed in an approximate center region on the left surface of the closing part 45. The sensor-gear support shaft 51 has a general columnar shape that is elongated in the left-right direction. The sensor-gear support shaft 51 protrudes leftward from the left surface of the closing part 45.

The guide part 52 has a general C-shape in a side view, with the opening of the "C" facing rearward. The guide part 52 has a general semicylindrical shape that extends in the left-right direction. The guide part 52 protrudes leftward from the left surface of the closing part 45. The guide part 52 is positioned to encircle the sensor-gear support shaft 51 such that a space is formed between an inner peripheral surface of the guide part 52 and an outer circumferential surface of the sensor-gear support shaft 51.

The guide part 52 has a first sloped surface 55, a level surface 56, a second sloped surface 57, and a cutout surface 58.

In a left side view, the first sloped surface 55 constitutes a left surface of the guide part 52 on its upstream end in a counterclockwise direction. The first sloped surface 55 is formed continuously with the left surface of the closing part 45 and slopes leftward while progressing downstream in the counterclockwise direction.

The level surface 56 constitutes the left surface of the guide part 52 between the first sloped surface 55 and second sloped surface 57. The level surface 56 is formed continuously with a downstream end of the first sloped surface 55 in the counterclockwise direction and extends further downstream in the counterclockwise direction while staying parallel to the closing part 45.

In a left side view, the second sloped surface 57 constitutes the left surface of the guide part 52 on its downstream end in the counterclockwise direction.

The second sloped surface 57 is formed continuously with a downstream end of the level surface 56 in the counterclockwise direction and slopes rightward while proceeding downstream in the counterclockwise direction.

The cutout surface 58 is a rightward cutout formed in a downstream end of the second sloped surface 57 in the counterclockwise direction in the left side view. The cutout surface 58 extends in the left-right direction and connects the downstream end of the second sloped surface 57 to the left surface of the closing part 45.

The first stopper 53 has a plate shape that is elongated in a circumferential direction conforming to the rotation of a large-diameter gear 77 described later. The first stopper 53 protrudes leftward from a lower front peripheral edge of the recessed part 49. The first stopper 53 is positioned rearward from an upstream end of the guide part 52 in the counterclockwise direction in a left side view, such that a gap is formed between the first stopper 53 and guide part 52.

The left surface of the closing part 45 positioned between the first stopper 53 and the upstream end of the guide part 52 relative to the counterclockwise direction in a left side view is defined as a contact surface 60. The contact surface 60 is an example of a first contact portion. Here, the contact surface 60 is formed continuously with the first sloped surface 55 of the guide part 52.

The second stopper 54 has a plate shape that extends in a circumferential direction conforming to the rotation of the second gear part 81 described later. The second stopper 54 protrudes leftward from an upper front peripheral edge of the recessed part 49. The second stopper 54 is disposed to the rear of and spaced apart from the cutout surface 58 of the guide part 52.

Figure 8A:
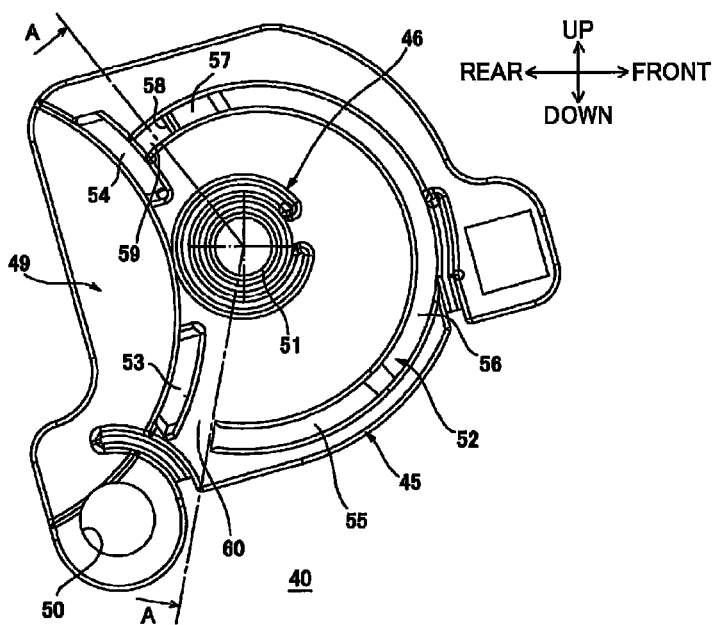
FIG. 8A is a left side view of the cap shown in FIG. 7.
Figure 8B:
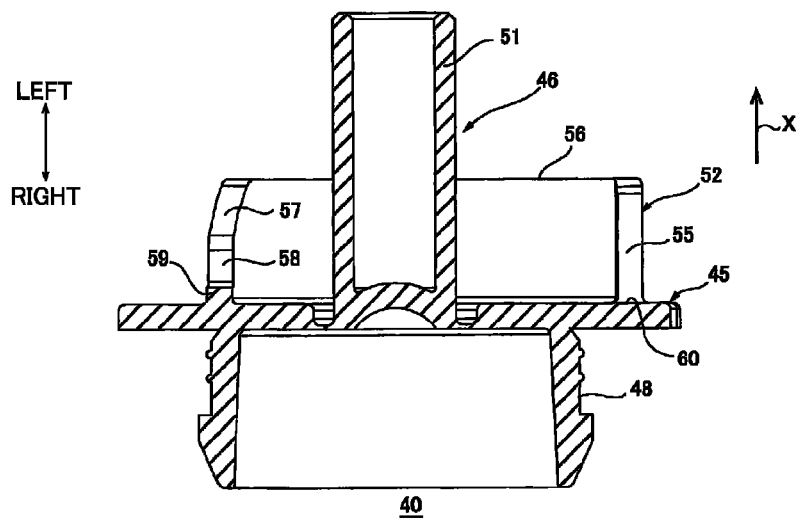
FIG. 8B is a cross-sectional view of the cap taken along a line A-A shown in FIG. 8A.

The protruding part 59 is disposed between the cutout surface 58 and the second stopper 54. As shown in FIGS. 7 and 8B, the protruding part 59 protrudes leftward from the left surface of the closing part 45 and connects a right end of the cutout surface 58 to a right edge of the second stopper 54 in an approximate vertical center region on the front surface thereof. Hence, the protruding part 59 protrudes farther in the first direction X than the contact surface 60, as illustrated in FIG. 8B.

As illustrated in FIG. 5, the cap 40 is mounted on the left wall 33 by inserting the insertion part 48 into the collar 36 and toner fill hole 37 such that the positioning part 38 is received in the positioning hole 50. When the cap 40 is mounted in this way, the closing part 45 covers the toner fill hole 37 from its left side, as shown in FIG. 4.

(2) Sensor Unit

As shown in FIGS. 4 and 5, the sensor unit 32 is disposed on the left side of the left wall 33. The sensor unit 32 includes a gear train 65, a spring member 100, and a cover member 66. The spring member 100 is an example of a biasing member.

(2-1) Gear Train

Figure 9:
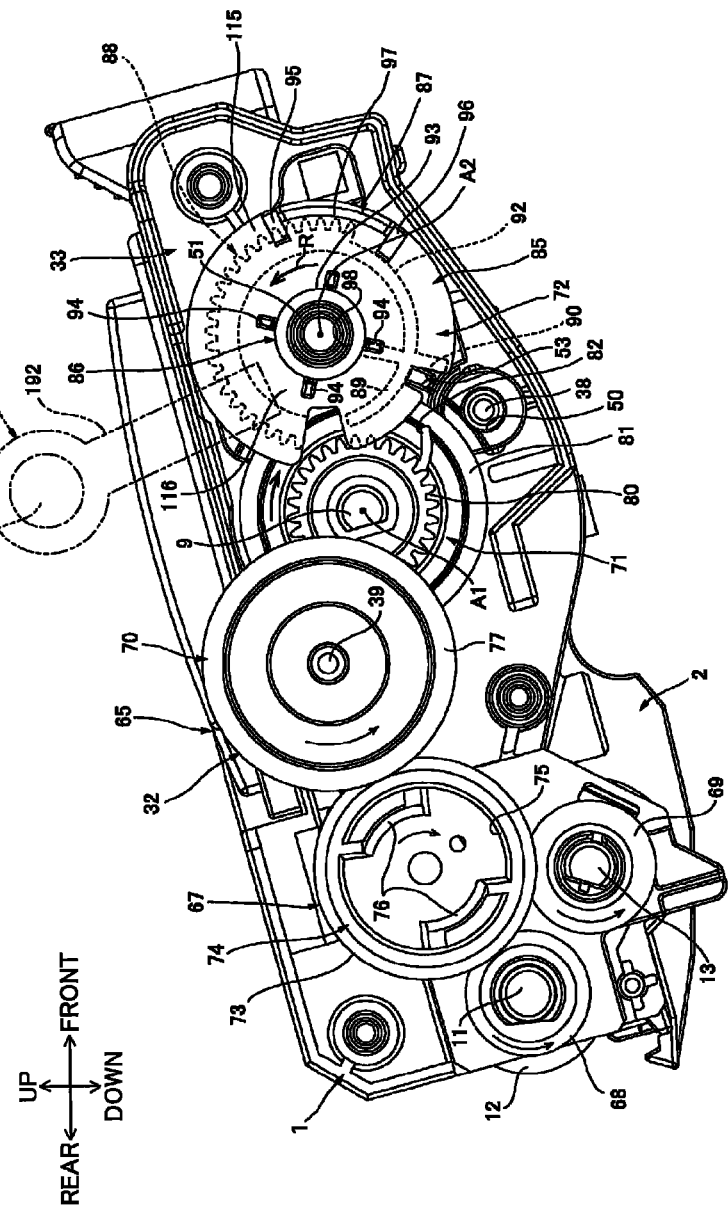
FIG. 9 is a first explanatory diagram illustrating an operation of the sensor unit according to the first embodiment for detecting a new product when the sensor gear is in its initial position.

As shown in FIG. 9, the gear train 65 includes a development coupling 67, a development gear 68, a supply gear 69, an idle gear 70, an agitator gear 71, and a sensor gear 72. The agitator gear 71 is an example of a drive-transmission member, and the sensor gear 72 is an example of a detected body.

(2-1-1) Development Coupling

The development coupling 67 is provided on the left surface of the left wall 33 near a rear end thereof. The development coupling 67 is rotatably supported on a rotational shaft (not shown). The rotational shaft is oriented in the left-right direction and fixed in the left wall 33 so as to be incapable of rotating relative to the left wall 33.

As shown in FIG. 5, the development coupling 67 has a general columnar shape that is elongated in the left-right direction. The development coupling 67 is integrally provided with a coupling gear part 73, and a coupling part 74.

The coupling gear part 73 constitutes a right portion of the development coupling 67. Gear teeth are formed around an entire circumferential surface of the coupling gear part 73.

The coupling part 74 constitutes a left portion of the development coupling 67. The coupling part 74 has a general columnar shape that is arranged coaxially with the coupling gear part 73. The coupling part 74 has a smaller outer diameter than the coupling gear part 73.

The coupling part 74 has a recessed coupling part 75, and a pair of protruding parts 76.

The recessed coupling part 75 is formed in a left endface of the coupling part 74. The recessed coupling part 75 has a general circular shape in a side view and is recessed rightward from the left endface of the coupling part 74.

The protruding parts 76 are provided inside the recessed coupling part 75 and are positioned to diametrically oppose each other within the recessed coupling part 75. The protruding parts 76 protrude radially inward from an inner peripheral surface of the recessed coupling part 75 toward the center of the recessed coupling part 75. The protruding parts 76 have a general rectangular columnar shape that is elongated in the left-right direction.

(2-1-2) Development Gear

As shown in FIG. 9, the development gear 68 is disposed on the lower rear side of the development coupling 67. The development gear 68 has a general cylindrical shape that is oriented in the left-right direction. Gear teeth are formed around an entire circumferential surface of the development gear 68.

The development gear 68 is mounted on the left end of the developing-roller shaft 11 so as to be incapable of rotating relative to the developing-roller shaft 11. An upper front portion of the development gear 68 is intermeshed with a lower rear portion of the coupling gear part 73 of the development coupling 67.

(2-1-3) Supply Gear

The supply gear 69 is disposed below the development coupling 67. The supply gear 69 has a general cylindrical shape that is elongated in the left-right direction. Gear teeth are formed around an entire circumferential surface of the supply gear 69.

The supply gear 69 is mounted on the left end of the supply-roller shaft 13 so as to be incapable of rotating relative to the supply-roller shaft 13. A top edge portion of the supply gear 69 is intermeshed with a bottom edge portion of the coupling gear part 73 of the development coupling 67.

(2-1-4) Idle Gear

Figure 19:
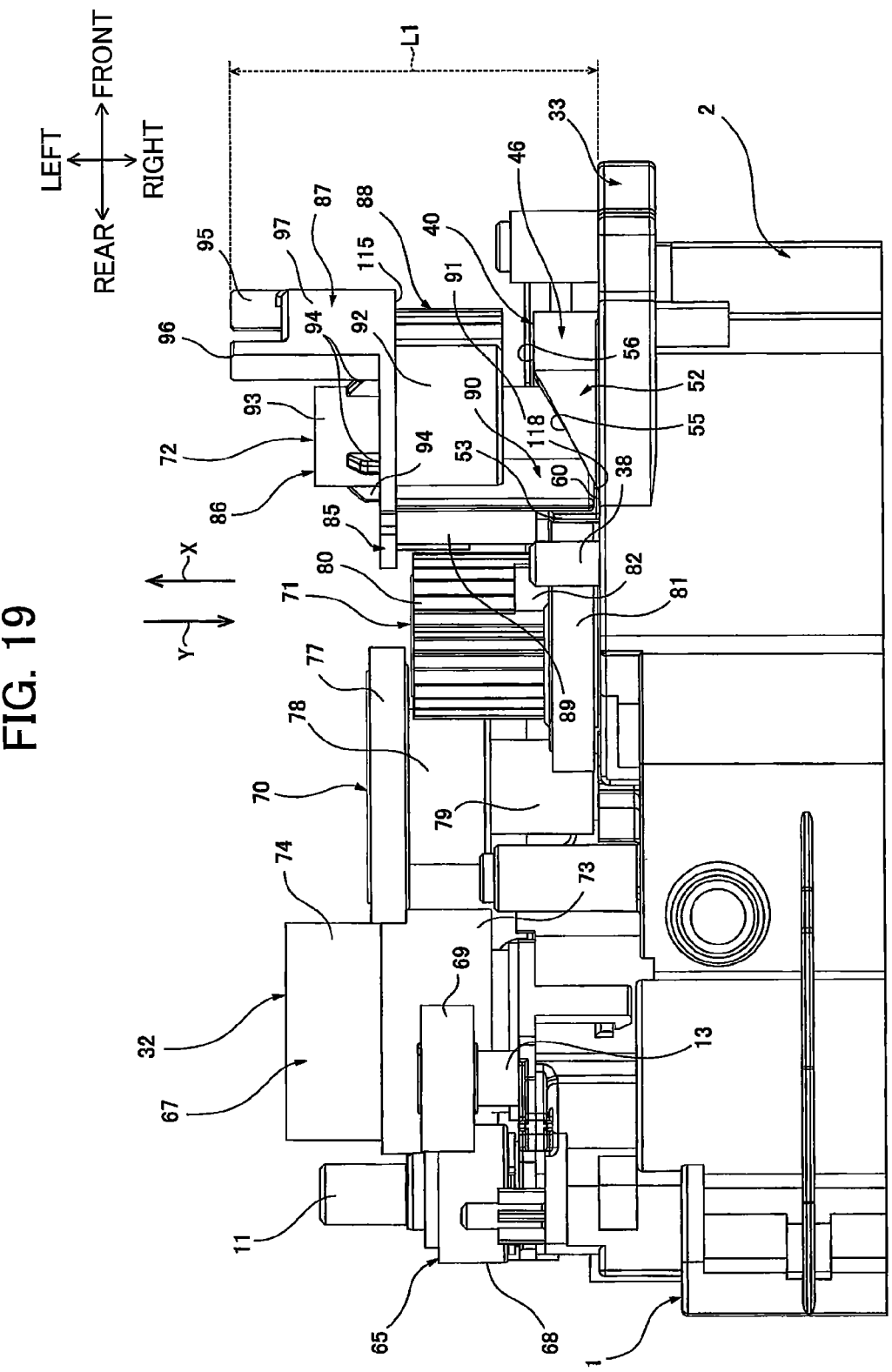
FIG. 19 is a bottom view of the gear train shown in FIG. 9, showing the sensor gear according to the first embodiment in its initial position.

The idle gear 70 is disposed frontward of the development coupling 67. As shown in FIG. 19, the idle gear 70 integrally includes a large-diameter gear 77, an intermediate section 78, and a small-diameter gear 79.

The large-diameter gear 77 constitutes a left end portion of the idle gear 70. The large-diameter gear 77 has a general annular shape having a thickness in the left right direction. Gear teeth are formed around an entire circumferential surface of the large-diameter gear 77.

The intermediate section 78 has a general cylindrical shape that is coaxial with the large-diameter gear 77. The intermediate section 78 protrudes rightward from a right surface of the large-diameter gear 77. The intermediate section 78 has an outer diameter smaller than an outer diameter of the large-diameter gear 77, and an inner diameter substantially equivalent to that of the large-diameter gear 77. The intermediate section 78 has a right endface that is closed.

The small-diameter gear 79 has a general cylindrical shape that is coaxial with the intermediate section 78. The small-diameter gear 79 protrudes rightward from the right endface of the intermediate section 78. The small-diameter gear 79 has an outer diameter smaller than the outer diameter of the intermediate section 78, while having an inner diameter slightly larger than the outer diameter of the idle-gear support shaft 39. Gear teeth are formed around an entire circumferential surface of the small-diameter gear 79.

As shown in FIG. 5, the idle gear 70 is rotatably supported on the left wall 33 with the idle-gear support shaft 39 received in the small-diameter gear 79 such that the small-diameter gear 79 can rotate relative to the idle-gear support shaft 39. As shown in FIG. 9, the idle gear 70 is provided on the front side of the development coupling 67, and a rear end portion of the large-diameter gear 77 is intermeshed with a front end portion of the coupling part 74 constituting the development coupling 67.

(2-1-5) Agitator Gear

The agitator gear 71 is disposed on the lower front side of the idle gear 70. The agitator gear 71 is integrally provided with a first gear part 80, a second gear part 81, and a first engaging part 82. The first gear part 80 is an example of an abutment portion.

As shown in FIG. 19, the first gear part 80 constitutes a left portion of the agitator gear 71. The first gear part 80 has a general cylindrical shape that is elongated in the left-right direction. Gear teeth are formed around an entire circumferential surface of the first gear part 80.

The second gear part 81 constitutes a right portion of the agitator gear 71 and is adjacent to the right side of the first gear part 80. In other words, the second gear part 81 is positioned upstream of the first gear part 80 in the first direction X.

The second gear part 81 has a general annular shape and is positioned coaxially with the first gear part 80. The second gear part 81 has an outer diameter larger than that of the first gear part 80. Gear teeth are formed around an entire circumferential surface of the second gear part 81.

The first engaging part 82 is disposed on a left surface of the second gear part 81. This left surface of the second gear part 81 corresponds to a downstream end surface in the first direction X. The first engaging part 82 has a plate shape that protrudes leftward from the left surface of the second gear part 81. In other words, the first engaging part 82 is positioned farther leftward than the gear teeth formed on the second gear part 81. As shown in the left side view of FIG. 9, the first engaging part 82 is sloped relative to a radial direction of the agitator gear 71. More specifically, in a direction away from the rotational center (center axis A1) of the agitator gear 71, the first engaging part 82 slopes toward the counterclockwise side (downstream side) relative to the rotating direction of the agitator gear 71.

As shown in FIG. 19, the first engaging part 82 has an inner end that is connected to the outer circumferential surface (outer peripheral surface) of the first gear part 80 at the right edge thereof, the inner end positioned in the radial direction of the second gear part 81. In other words, the first engaging part 82 is formed continuously with both the outer circumferential surface (outer peripheral surface) of the first gear part 80 and the downstream end surface of the second gear part 81 in the first direction X.

As shown in FIG. 9, the agitator gear 71 is mounted on the left end of the agitator shaft 9 so as to be incapable of rotating relative to the agitator shaft 9. With this configuration, the agitator gear 71 can rotate relative to the left wall 33 about a center axis A1 of the agitator shaft 9. The center axis A1 of the agitator shaft 9 is oriented in the left-right direction and is an example of a first axis.

As shown in FIG. 19, a rear end portion of the second gear part 81 is intermeshed with a front end portion of the small-diameter gear 79 constituting the idle gear 70. Rear end portions of the first gear part 80 and the second gear part 81 are both separated to the right of the front end portion of the large-diameter gear 77 and overlap the front end portion of the large-diameter gear 77 when projected in the second direction Y.

(2-1-6) Sensor Gear

As shown in FIG. 9, the sensor gear 72 is disposed on the front side of the agitator gear 71. While operations of the sensor gear 72 will be described later in greater detail, a drive force transmitted from the agitator gear 71 causes the sensor gear 72 to rotate irreversibly in a rotating direction R from an initial position to a terminal position. The initial position is an example of a first position, and the terminal position is an example of a second position. Further, the rotating direction R is an example of a moving direction. As indicated by the arrow in FIG. 9, the rotating direction R is the counterclockwise direction when viewing the housing 2 from its left side.

Figure 15:
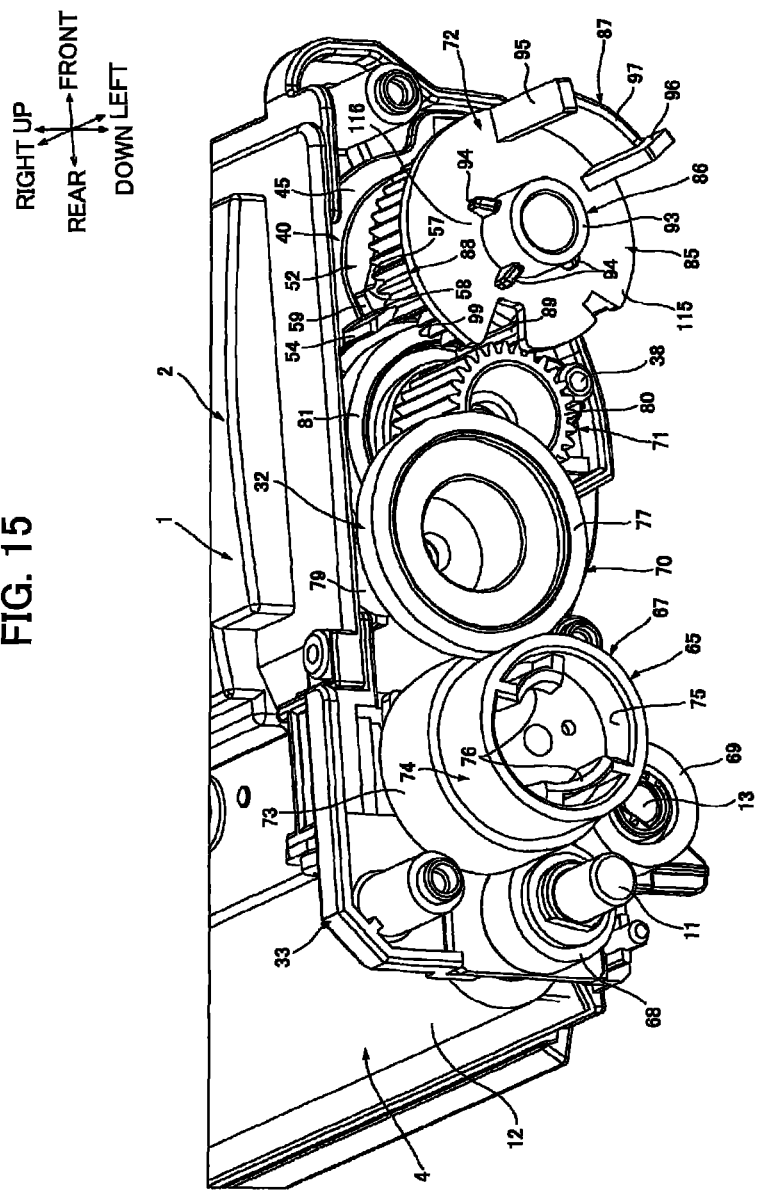
FIG. 15 is a perspective view of a gear train shown in FIG. 9 from the upper left side thereof, wherein the sensor gear according to the first embodiment is in its initial position.

The following description of the sensor gear 72 will be based on a state of the sensor gear 72 in its initial position shown in FIGS. 9, 15, and 19.

Figure 6A:
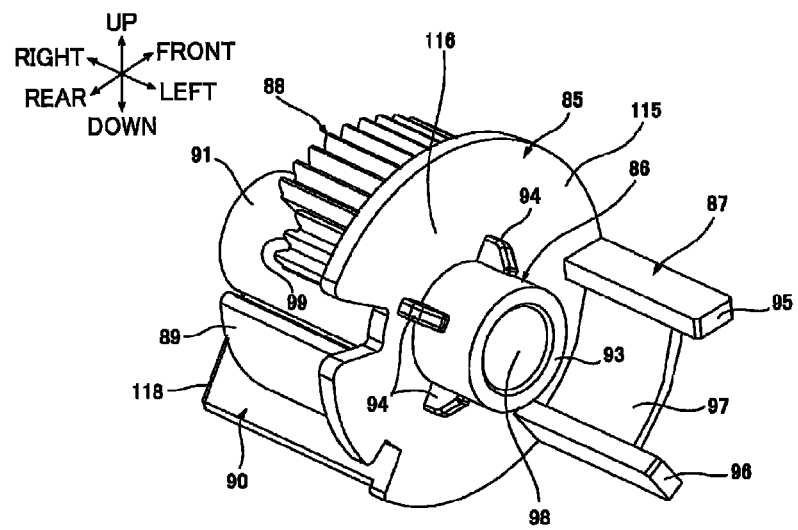
FIG. 6A is a perspective view of the sensor gear according to the first embodiment from the left rear side thereof.
Figure 6B:
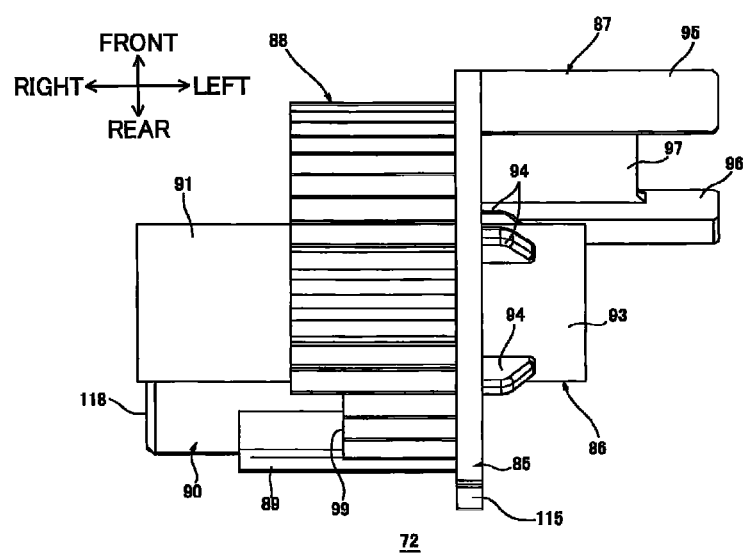
FIG. 6B is a plan view of the sensor gear according to the first embodiment shown in FIG. 6A.

The sensor gear 72 is formed of a heretofore known plastic. As shown in FIGS. 6A and 6B, the sensor gear 72 integrally includes a plate-shaped part 85, an anchoring part 86, a detected part 87, a shaft insertion part 91, a sensor gear part 88, a guide rib 90, a connecting part 92, and a second engaging part 89. The sensor gear part 88 is an example of a receiving portion, and the guide rib 90 is an example of a rib.

As shown in FIG. 9, the plate-shaped part 85 has a plate shape and is generally circular in a side view. The plate-shaped part 85 has an outer diameter larger than that of the second gear part 81 of the agitator gear 71.

The plate-shaped part 85 includes a peripheral part 115, and an inner part 116. The peripheral part 115 constitutes a radially outer portion of the plate-shaped part 85 and is the portion positioned downstream of gear teeth formed on the sensor gear part 88 described later in an outwardly radial direction of the sensor gear 72. The inner part 116 constitutes an inner portion of the plate-shaped part 85 in the radial direction that is encompassed by the peripheral part 115. The inner part 116 is the portion positioned upstream of the gear teeth formed on the sensor gear part 88 with respect to the outwardly radial direction of the sensor gear 72.

The inner part 116 has an insertion hole 98 formed in its center portion. The insertion hole 98 has a general circular shape in a side view and penetrates the center portion of the inner part 116 in the left-right direction. The insertion hole 98 has a diameter slightly larger than the outer diameter of the sensor-gear support shaft 51.

As shown in FIGS. 6A and 6B, the anchoring part 86 is provided on a left surface of the inner part 116 of the plate-shaped part 85. The anchoring part 86 includes a boss 93, and four anchoring protrusions 94. The boss 93 has a general cylindrical shape and is positioned coaxially with the plate-shaped part 85. The boss 93 protrudes leftward from a peripheral edge of the insertion hole 98. The four anchoring protrusions 94 are arranged at approximately 90-degree intervals around a circumference of the boss 93. Each anchoring protrusion 94 has a general rectangular shape in a side view and protrudes outward from an outer surface of the boss 93 in a radial direction thereof. The right end of each anchoring protrusion 94 is connected to the left surface of the plate-shaped part 85.

The detected part 87 is disposed on the left surface of the plate-shaped part 85 in a radially outer portion thereof. The detected part 87 includes a first detected protrusion 95, a second detected protrusion 96, and a linking part 97.

The first detected protrusion 95 is disposed on the front side of the boss 93 with a gap formed therebetween. The first detected protrusion 95 has a rail-like shape that extends in the left-right direction and protrudes leftward from the plate-shaped part 85. In a side view, the first detected protrusion 95 is elongated in a radial direction of the sensor gear 72, and has an outer portion in the radial direction overlapping with the left surface of the peripheral part 115. The outer surface of the first detected protrusion 95 in the radial direction is substantially flush with an outer peripheral surface of the plate-shaped part 85.

The second detected protrusion 96 is disposed obliquely below and forward of the boss 93 with a gap formed therebetween. The second detected protrusion 96 has a rail-like shape that extends in the left-right direction and protrudes leftward from the left surface of the plate-shaped part 85. In a side view, the second detected protrusion 96 is elongated in a radial direction of the sensor gear 72 and has an outer portion in the radial direction overlapping the left surface of the peripheral part 115. The outer surface of the second detected protrusion 96 in the radial direction is substantially flush with the outer peripheral surface of the plate-shaped part 85.

The second detected protrusion 96 has a left-right dimension approximately the same as that of the first detected protrusion 95.

The linking part 97 is disposed between the first detected protrusion 95 and second detected protrusion 96 and follows the circumference of the sensor gear 72. The linking part 97 has a general plate shape that extends in the left-right direction and protrudes leftward from the left surface of the plate-shaped part 85. In a side view, the linking part 97 extends in a circumferential direction of the sensor gear 72 and connects the outer portion of the first detected protrusion 95 in the radial direction of the sensor gear 72 with the outer portion of the second detected protrusion 96 in the radial direction of the sensor gear 72. Accordingly, the linking part 97 is disposed on the left surface of the peripheral part 115. The linking part 97 has an outer surface in the radial direction of the sensor gear 72 substantially flush with the outer peripheral surface of the plate-shaped part 85.

The linking part 97 has a shorter left-right direction than that of the first detected protrusion 95.

The shaft insertion part 91 is disposed on a right surface of the inner part 116 constituting the plate-shaped part 85. The shaft insertion part 91 has a general cylindrical shape that is arranged coaxially with the plate-shaped part 85. The shaft insertion part 91 protrudes rightward from a peripheral edge of the insertion hole 98.

The sensor gear part 88 is disposed on the right surface of the inner part 116 constituting the plate-shaped part 85. As shown in FIG. 9, the sensor gear part 88 has a general semicylindrical shape that is positioned coaxially with the shaft insertion part 91. In a side view, the sensor gear part 88 is open on its lower rear side. As shown in FIG. 6A, the sensor gear part 88 protrudes rightward from the right surface of the inner part 116. Gear teeth are formed around an entire outer peripheral surface of the sensor gear part 88.

The sensor gear part 88 is disposed around an upper front portion on the outer peripheral surface of the shaft insertion part 91 while being separated from this upper front portion.

As shown in FIG. 9, the outer peripheral 1 surface of the sensor gear part 88 has a radius of curvature shorter than the outer diameter of the plate-shaped part 85. Therefore, the peripheral part 115 of the plate-shaped part 85 is positioned downstream of the gear teeth formed on the outer peripheral surface of the sensor gear part 88 in the outwardly radial direction of the sensor gear 72. Thus, the radially outer portions of the first detected protrusion 95 and the second detected protrusion 96 are separated farther from a center axis A2 of the sensor-gear support shaft 51 than the gear teeth on the outer peripheral surface of the sensor gear part 88 from the center axis A2.

As shown in FIG. 6A, the sensor gear part 88 has a cutout part 99. The cutout part 99 is formed in a right portion of the sensor gear part 88 at the downstream end in the rotating direction R. The cutout part 99 has a general rectangular shape in a rear side view and is formed as a cutout in the right portion of the sensor gear part 88 at the downstream end in the rotating direction R.

The guide rib 90 is disposed on the right surface of the plate-shaped part 85. As shown in FIG. 9, the guide rib 90 is disposed to the lower rear side of the boss 93. In a side view, the guide rib 90 has a general plate shape that extends in the radial direction of the sensor gear 72. The guide rib 90 has an inner edge with respect to the radial direction that is connected to the lower rear side of the boss 93. As shown in FIG. 6B, the guide rib 90 extends rightward from the right surface of the plate-shaped part 85. The left-right dimension of the guide rib 90 is greater than that of the sensor gear part 88.

Figure 20:
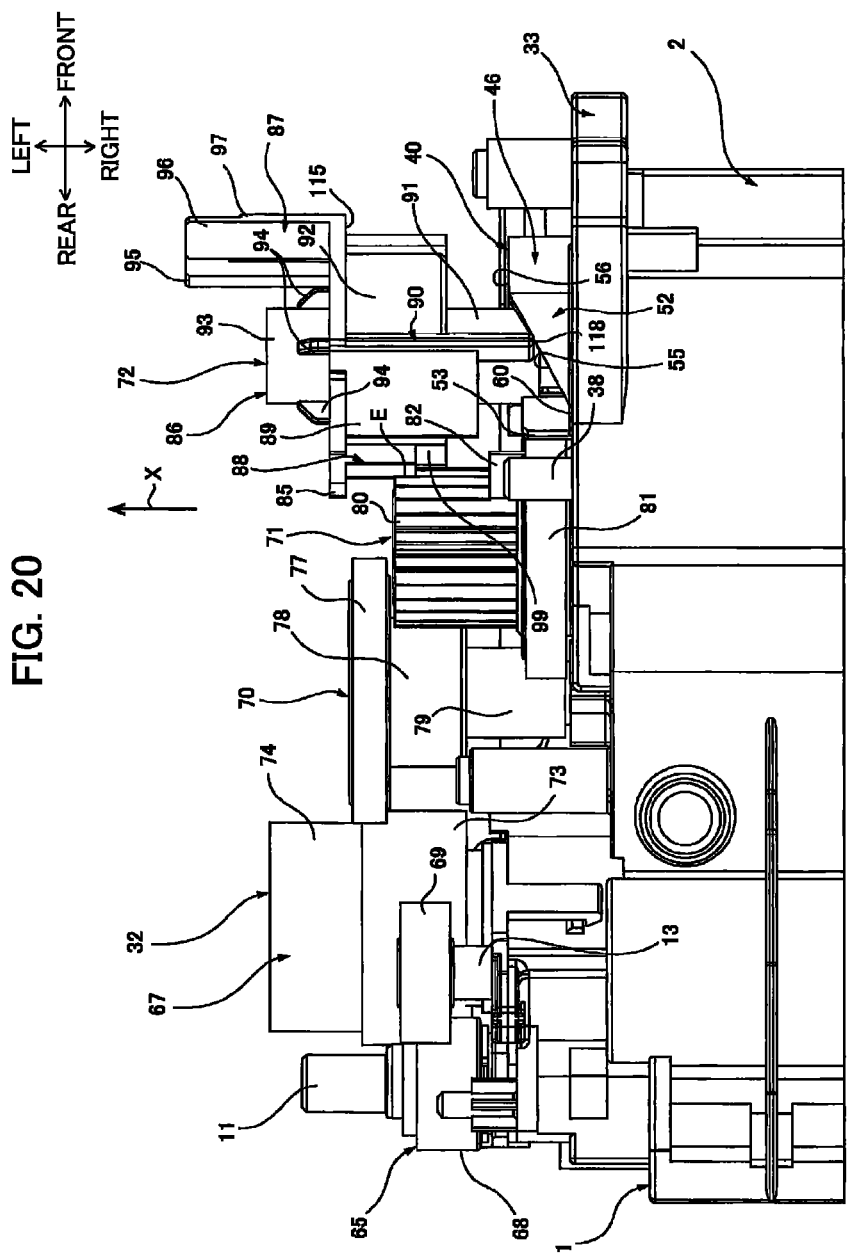
FIG. 20 is a bottom view of the gear train shown in FIG. 11, showing the first gear part of the agitator gear intermeshed with the sensor gear part of the sensor gear according to the first embodiment.

The guide rib 90 has a rear end serving as a sliding part 118. As shown in FIG. 20, when viewed in a longitudinal direction of the guide rib 90 aligned with the radial direction of the sensor gear 72, the sliding part 118 has a semicircular arc shape with its convex side facing rightward.

The connecting part 92 is disposed on the right surface of the inner part 116 constituting the plate-shaped part 85. As shown in FIG. 9, the connecting part 92 is disposed on the lower front side of the shaft insertion part 91 and is spaced apart therefrom. The connecting part 92 connects the upstream end of the sensor gear part 88 in the rotating direction R to a radial center region on the front surface of the guide rib 90 while following the circumferential direction of the sensor gear 72. As shown in FIG. 19, the connecting part 92 protrudes rightward from the right surface of the plate-shaped part 85. The left-right dimension of the connecting part 92 is approximately equivalent to that of the sensor gear part 88.

The second engaging part 89 is disposed on the right surface of the inner part 116 constituting the plate-shaped part 85. As shown in FIG. 9, the second engaging part 89 is disposed below and rearward of the boss 93 with a gap formed therebetween. The second engaging part 89 is positioned upstream of the guide rib 90 in the rotating direction R. The second engaging part 89 has a general arc shape in a side view that follows the circumference of the sensor gear 72. The second engaging part 89 extends from an approximate radial center region on the rear surface of the guide rib 90 toward upstream in the rotating direction R. As shown in FIG. 6B, the second engaging part 89 protrudes rightward from the right surface of the plate-shaped part 85. The second engaging part 89 has a left-right dimension longer than that of the sensor gear part 88 and shorter than that of the guide rib 90.

As will be described later in greater detail, the sensor gear 72 is supported on the left wall 33 through the cap 40, with the shaft insertion part 91, insertion hole 98, and boss 93 receiving the sensor-gear support shaft 51 so as to be capable of rotating relative to the sensor-gear support shaft 51. With this configuration, the sensor gear 72 can rotate relative to the left wall 33 about the center axis A2 of the sensor-gear support shaft 51. Note that the center axis A2 of the sensor-gear support shaft 51 is oriented in the left-right direction and is an example of a second axis.

(2-2) Spring Member

As shown in FIG. 4, the spring member 100 is an air-core coil type spring that is elongated in the left-right direction. The spring member 100 is anchored to the sensor gear 72 by fitting the anchoring part 86, i.e., the boss 93 and anchoring protrusions 94, into a right end of the spring member 100. With this arrangement, the spring member 100 is supported by the sensor gear 72.

(2-3) Gear Cover

As shown in FIG. 3, the cover member 66 covers the gear train 65 from a perspective in the second direction Y. The cover member 66 includes a first cover 101, and a second cover 102. The second cover 102 is an example of a gear cover.

The first cover 101 constitutes a rear portion of the cover member 66 and covers the left side of the rear portion of the gear train 65, and more specifically the development coupling 67, development gear 68, and supply gear 69. The first cover 101 has a box-like shape that is open on the right side. The first cover 101 is formed in a sufficient size for covering the development coupling 67, development gear 68, and supply gear 69 in their entirety.

The first cover 101 has a coupling exposure hole 104. The coupling exposure hole 104 is formed in a left wall of the first cover 101. The coupling exposure hole 104 has a general circular shape in a side view and penetrates the left wall of the first cover 101 in the left-right direction at an approximate center region thereof.

The first cover 101 is fastened to the rear portion of the left wall 33 with screws. When fastened to the left wall 33, the first cover 101 covers the coupling part 74 of the development coupling 67, the development gear 68, and the supply gear 69 in their entirety while the recessed coupling part 75 of the development coupling 67 is exposed through the coupling exposure hole 104.

The second cover 102 constitutes a front portion of the cover member 66 and covers the left side of the front portion of the gear train 65, and more specifically the idle gear 70, agitator gear 71, and sensor gear 72. The second cover 102 has a box-like shape that is open on the right side. The second cover 102 is formed of sufficient size for covering the idle gear 70, agitator gear 71, and sensor gear 72 in their entirety.

As shown in FIG. 5, the second cover 102 has a through-hole 105, a circumferential wall 106, a receiving part 107, and a connecting part 108.

The through-hole 105 is disposed on a left wall of the second cover 102. The through-hole 105 has a general circular shape in a side view and penetrates the left wall of the second cover 102 on a front portion thereof in the left-right direction. The through-hole 105 has a diameter greater than the outer diameter of the plate-shaped part 85.

The circumferential wall 106 has a general cylindrical shape that is elongated in the left-right direction. The circumferential wall 106 protrudes leftward from a peripheral edge of the through-hole 105.

The receiving part 107 has a general cylindrical shape that is elongated in the left-right direction and closed on its left end. The receiving part 107 is disposed inside the circumferential wall 106 and arranged coaxially with the same.

The connecting part 108 is disposed in the circumferential wall 106 on the bottom of the receiving part 107. The connecting part 108 extends in a radial direction of the circumferential wall 106 and connects the outer circumferential surface of the receiving part 107 with the inner circumferential surface of the circumferential wall 106.

A space defined by the inner circumferential surface of the circumferential wall 106, the outer circumferential surface of the receiving part 107, and both front and rear surfaces of the connecting part 108 will be called a detected-part insertion hole 109. The detected-part insertion hole 109 has a general C-shape in a side view with the opening of the "C" facing downward. The detected-part insertion hole 109 penetrates the second cover 102 in the left-right direction.

(2-4) Assembling the Sensor Gear, Spring Member, and Second Cover on the Housing Next, a process of assembling the sensor gear 72, spring member 100, and second cover 102 on the housing 2 will be described with reference to FIG. 4.

To assemble the sensor gear 72, spring member 100, and second cover 102 on the housing 2, first the development gear 68, supply gear 69, idle gear 70, and agitator gear 71 must be arranged on the left surface of the left wall 33, as described above. Then the first cover 101 is fastened to the left wall 33 with screws.

Next, the sensor gear 72 that supports the spring member 100 is assembled to the cap 40 mounted on the left wall 33 from the left side. At this time, the shaft insertion part 91 of the sensor gear 72 receives the sensor-gear support shaft 51 of the cap 40 such that the shaft insertion part 91 can rotate relative to the sensor-gear support shaft 51.

With this configuration, the cap 40 supports the sensor gear 72 such that the sensor gear 72 can rotate about the center axis A2 of the sensor-gear support shaft 51, as illustrated in FIG. 9.

Next, the second cover 102 is assembled to the left side of the spring member 100 such that the receiving part 107 receives the left end of the spring member 100, as illustrated in FIG. 4.

With this configuration, the spring member 100 is interposed in the left-right direction between the plate-shaped part 85 of the sensor gear 72 and the inner (right) surface on the left end of the receiving part 107. Accordingly, the spring member 100 constantly urges the sensor gear 72 rightward, i.e., toward the cap 40.

Next, the second cover 102 is fastened to the left wall 33 with screws.

At this time, the plate-shaped part 85 and detected part 87 of the sensor gear 72 are positioned inside the circumferential wall 106 of the second cover 102, as illustrated in FIG. 3. In addition, the left ends of the first detected protrusion 95 and second detected protrusion 96 are arranged slightly rightward (inward) from the left end surface of the circumferential wall 106.

This completes the process of assembling the sensor gear 72, spring member 100, and second cover 102 on the housing 2.

4. Detailed Description of the Main Casing

As shown in FIGS. 3 and 9, the main casing 16 is also provided with a body-side coupling 200, and a sensor mechanism 190.

As shown in FIG. 3, the body-side coupling 200 is disposed at a position separated from and leftward of the recessed coupling part 75 of the development coupling 67 when the developing cartridge 1 is mounted in the main casing 16. The body-side coupling 200 has a general columnar shape that is oriented in the left-right direction. The body-side coupling 200 has a right end configured in a shape that can be inserted into the recessed coupling part 75.

The body-side coupling 200 is configured to move with respect to the left-right direction in association with opening and closing operations of the front cover 21 according to a heretofore known interlocking mechanism. A drive source such as a motor (not shown) is provided in the main casing 16 for transmitting a drive force to the body-side coupling 200. When the drive source transmits a drive force to the body-side coupling 200, the body-side coupling 200 rotates clockwise in a left side view.

As shown in FIGS. 9 through 14, the sensor mechanism 190 serves to detect the first detected protrusion 95 and second detected protrusion 96. When the developing cartridge 1 is mounted in the main casing 16, the sensor mechanism 190 is positioned leftward and separated from the front portion of the developing cartridge 1. The sensor mechanism 190 includes an actuator 191, and an optical sensor (not shown).

As shown in FIG. 9, the actuator 191 includes a pivoting shaft 193, and a contact lever 192.

The pivoting shaft 193 has a general columnar shape that extends in the left-right direction and is rotatably supported in the main casing 16. The contact lever 192 extends radially outward from the pivoting shaft 193.

Figure 12:
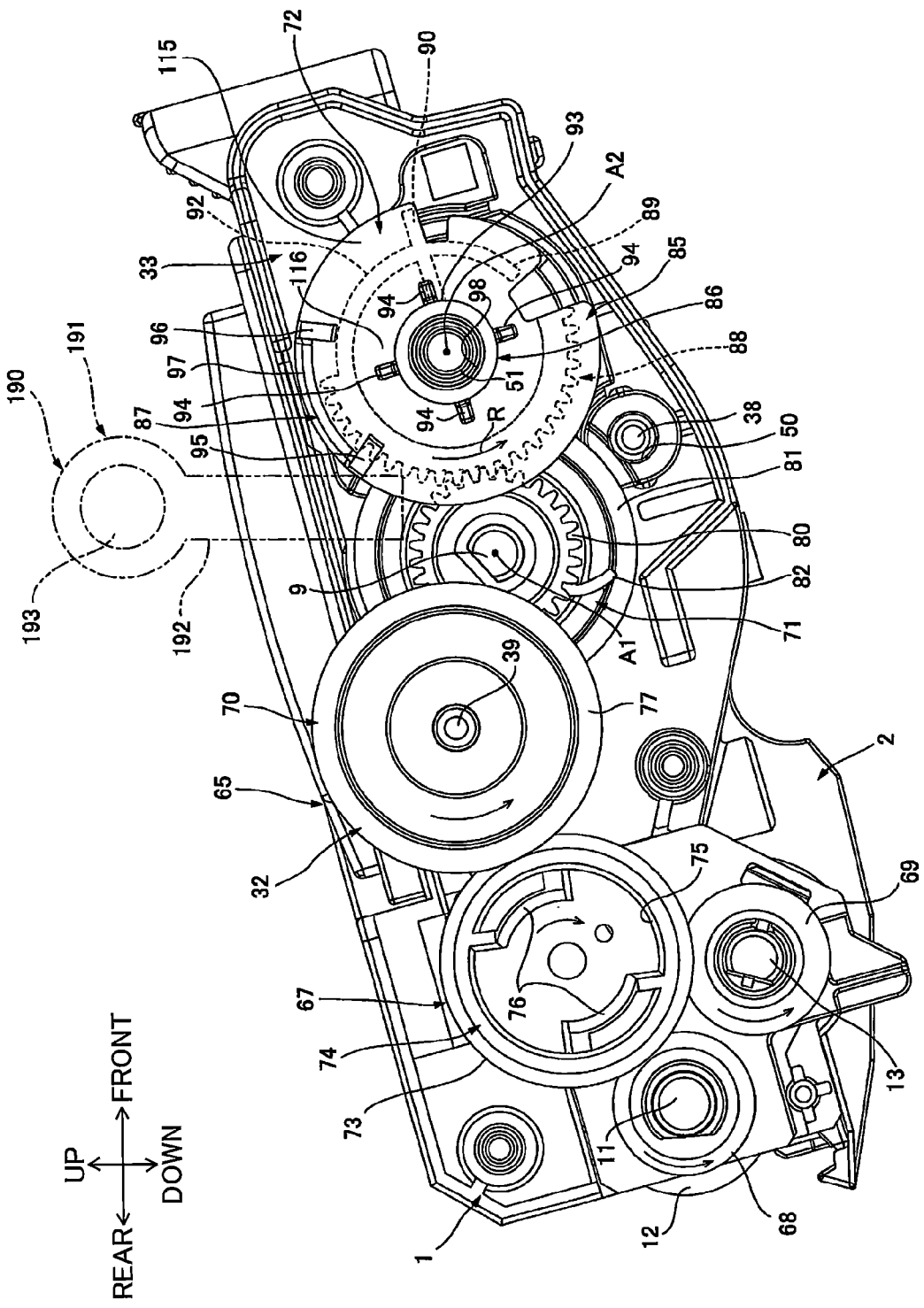
FIG. 12 is a fourth explanatory diagram illustrating the operation of the sensor unit according to the first embodiment for detecting a new product when the sensor gear is in an advanced position and a first detected protrusion of the sensor gear is in contact with an actuator.

The actuator 191 is capable of pivoting between a non-detection position in which the contact lever 192 extends diagonally downward and forward from the pivoting shaft 193, and a detection position in which the contact lever 192 extends generally downward from the pivoting shaft 193, as shown in FIG. 12. The actuator 191 is constantly urged toward the non-detection position by a biasing force of a spring (not shown).

The optical sensor (not shown) includes a light-emitting element and a light-receiving element of a well-known structure. The optical sensor is configured to detect the pivoting of the actuator 191. More specifically, the optical sensor outputs an OFF signal when the actuator 191 is in the non-detection position and an ON signal when the actuator 191 is in the detection position. While not shown in the drawings, a microcomputer is electrically connected to the optical sensor.

5. Operations for Mounting and Removing the Developing Cartridge Relative to the Main Casing and for Detecting Whether the Developing Cartridge is New (5-1) Operations for Mounting the Developing Cartridge in the Main Casing When the developing cartridge 1 is a new product, that is, before the developing cartridge 1 has been used for the first time, the sensor gear 72 is disposed in its initial position shown in FIGS. 9, 15, and 19. Thus, the initial position of the sensor gear 72 is its position prior to an operation being performed to rotate the sensor gear 72.

When the sensor gear 72 is in its initial position, the downstream end of the sensor gear part 88 in the rotating direction R is not engaged with the first gear part 80 of the agitator gear 71, but is positioned obliquely above and forward of the first gear part 80 and separated therefrom, as shown in FIG. 9. Further, the second engaging part 89 is disposed in a position overlapping the second gear part 81 in the first direction X while being separated from the second gear part 81 toward the downstream side in the first direction X, as illustrated in FIG. 19.

When the sensor gear 72 is in its initial position, the sliding part 118 of the guide rib 90 is in contact with the contact surface 60 of the cap 40 in the left-right direction, as illustrated in FIG. 19. The right portion of the guide rib 90 is disposed between the first stopper 53 and the lower end of the guide part 52, and downstream of the first stopper 53 in the rotating direction R and upstream of the first sloped surface 55 formed on the guide part 52 in the rotating direction R. With this configuration, the first stopper 53 restricts the sensor gear 72 from rotating upstream in the rotating direction R.

The distance between the left end of the first detected protrusion 95 and the left wall 33 in the left-right direction when the sensor gear 72 is in its initial position is now defined an initial distance L1 (see FIG. 19).

To mount a new developing cartridge 1 having this configuration in the main casing 16, an operator opens the front cover 21 as shown in FIG. 2 and inserts the developing cartridge 1 through the access opening 20 from the front side thereof and into the main casing 16. Subsequently, the operator closes the front cover 21.

This completes the operations for mounting the developing cartridge 1 in the main casing 16.

(5-2) Operations for Detecting Whether the Developing Cartridge is a New Product Next, operations for sensing the developing cartridge 1 will be described with reference to FIGS. 9 through 23. To facilitate the description, the cover member 66 and spring member 100 have been omitted from the developing cartridge 1 in these drawings.

When the operator closes the front cover 21, through a heretofore known interlocking mechanism (not shown), the body-side coupling 200 provided in the main casing 16 is inserted into the recessed coupling part 75 of the coupling part 74, as illustrated in FIG. 3, so as to be incapable of rotating relative to the recessed coupling part 75, and is engaged with the protruding parts 76.

Subsequently, a control unit (not shown) provided in the main casing 16 initiates a warm-up operation for the printer 15.

In the warm-up operation, the body-side coupling 200 inputs a drive force into the coupling part 74 of the development coupling 67, causing the development coupling 67 to rotate clockwise in a left side view, as illustrated in FIG. 9. The rotating development coupling 67 transmits a drive force to various gears engaged with the coupling gear part 73, and specifically to each of the development gear 68, supply gear 69, and large-diameter gear 77 of the idle gear 70.

When the drive force is transmitted to the development gear 68 and supply gear 69, the developing roller 4 rotates counterclockwise in a left side view, owing to the drive force transmitted to the development gear 68, while the supply roller 5 rotates counterclockwise in a left side view, owing to the drive force transmitted to the supply gear 69.

When the drive force is transmitted to the large-diameter gear 77, the idle gear 70 rotates counterclockwise in a left side view and transmits a drive force to the second gear part 81 of the agitator gear 71 engaged with the small-diameter gear 79 of the idle gear 70.

Figure 10:
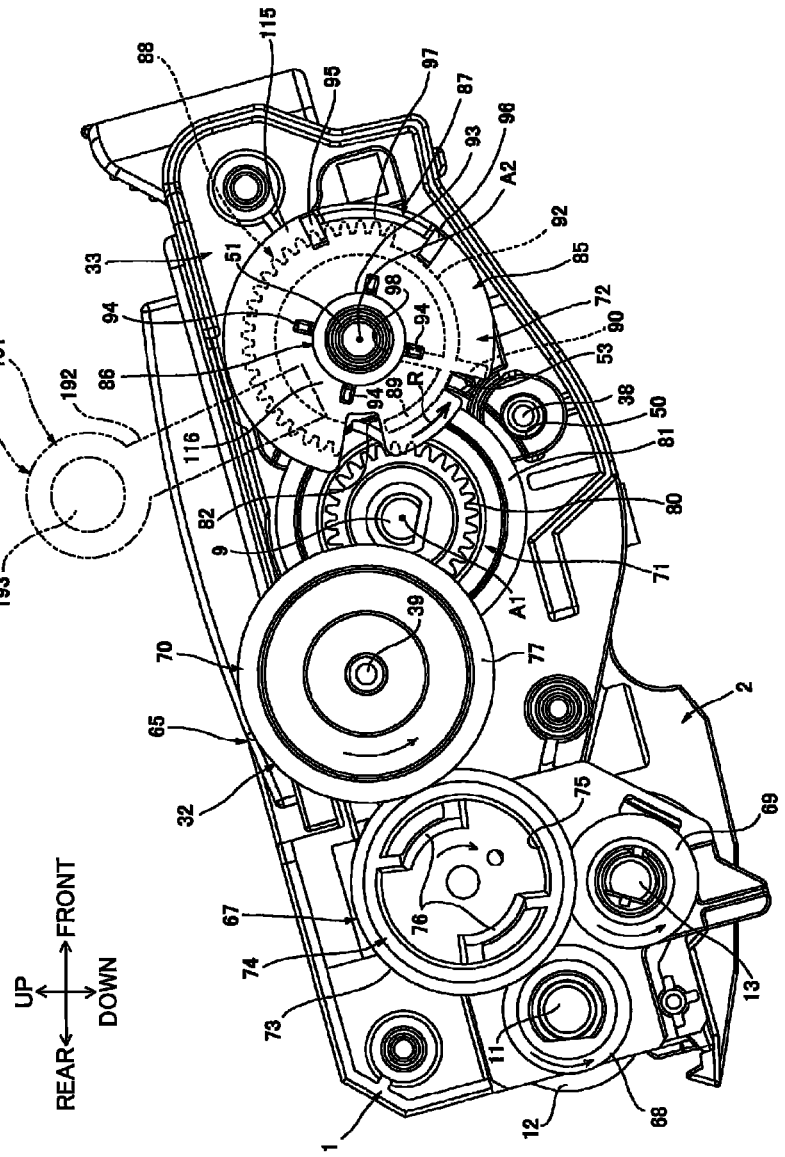
FIG. 10 is a second explanatory diagram illustrating the operation of the sensor unit according to the first embodiment for detecting a new product when a first engaging part of the agitator gear is contacting a second engaging part of the sensor gear while the sensor gear is in the initial position.
Figure 16:
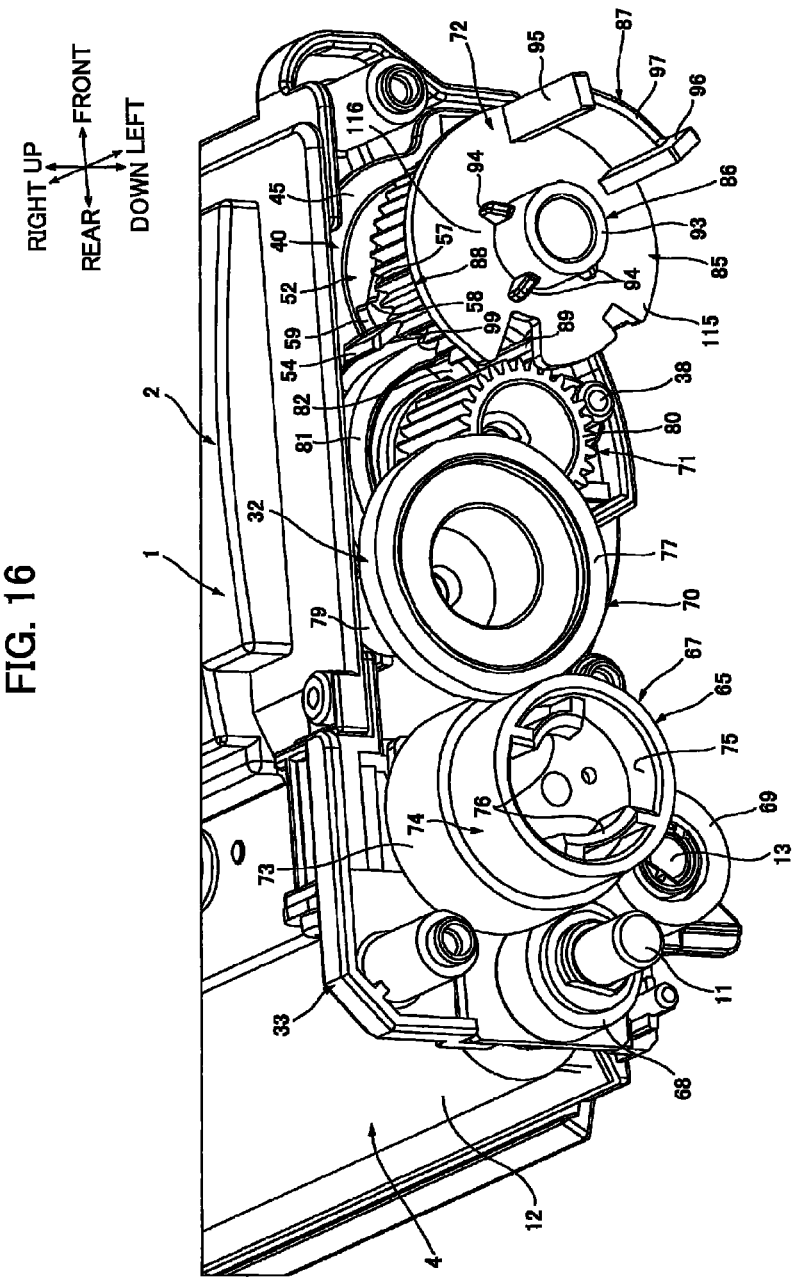
FIG. 16 is a perspective view of the gear train shown in FIG. 10 from the upper left side thereof, wherein the first engaging part of the agitator gear contacts the second engaging part of the sensor gear according to the first embodiment while the sensor gear is in its initial position.

When the drive force is transmitted to the second gear part 81, the agitator gear 71 begins to rotate clockwise in a left side view, as illustrated in FIGS. 9 and 10. The first engaging part 82 of the agitator gear 71 moves together with the rotating agitator gear 71, passing through the cutout part 99 formed in the sensor gear part 88 of the sensor gear 72, as illustrated in FIGS. 10 and 16. In other words, when the sensor gear 72 is in its initial position, the cutout part 99 is positioned on a path of the first engaging part 82 along which the first engaging part 82 moves while the agitator gear 71 rotates.

Thereafter, the first engaging part 82 contacts the upstream end in the rotating direction R of the second engaging part 89 of the sensor gear 72. Through this contact, the first engaging part 82 presses the upstream end of the second engaging part 89 in the rotating direction R diagonally downward and forward.

Figure 11:
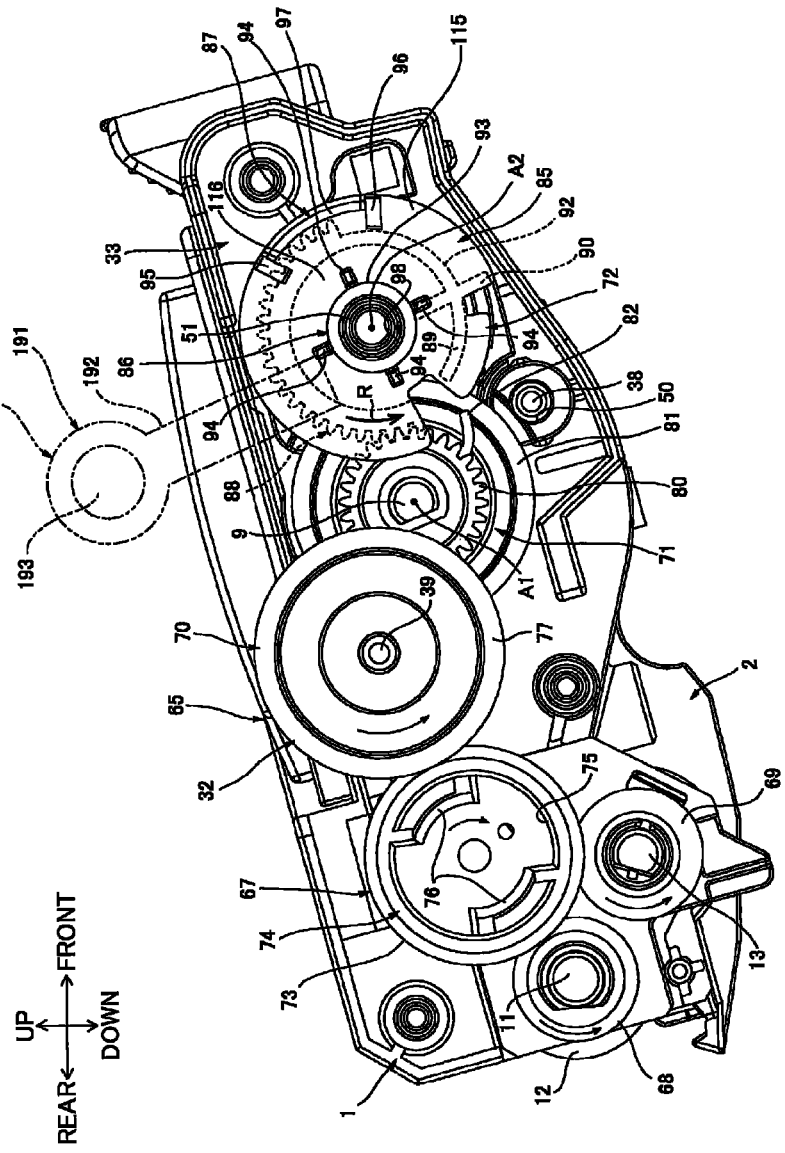
FIG. 11 is a third explanatory diagram illustrating the operation of the sensor unit according to the first embodiment for detecting a new product when a first gear part of the agitator gear is intermeshed with a sensor gear part of the sensor gear.

The pressure applied by the first engaging part 82 to the second engaging part 89 rotates the sensor gear 72 in the rotating direction R from its initial position. As the sensor gear 72 rotates, the downstream end of the sensor gear part 88 in the rotating direction R engages with (contacts) the front end portion of the first gear part 80, as shown in FIG. 11. At this time, the sensor gear part 88 is intermeshed with a portion E of the first gear part 80, the portion E being positioned downstream of the first engaging part 82 in the first direction X, as shown in FIG. 20.

The sliding part 118 provided on the guide rib 90 of the sensor gear 72 also moves in the rotating direction R as the sensor gear 72 rotates. In accordance with rotation of the sensor gear 72, the sliding part 118 moves from the contact surface 60 onto the first sloped surface 55 of the guide part 52.

Since the first gear part 80 of the agitator gear 71 is now in meshing engagement with the sensor gear part 88, the sensor gear part 88 receives a drive force from the first gear part 80 as the agitator gear 71 further rotates, thereby causing the sensor gear 72 to further rotate in the rotating direction R.

As the sensor gear 72 rotates further, the sliding part 118 of the guide rib 90 moves gradually leftward while sliding along the first sloped surface 55 toward the level surface 56.

Thus, while rotating, the sensor gear 72 moves gradually in the first direction X (i.e., leftward) against the urging force of the spring member 100 so as to separate from the left wall 33. Accordingly, both the first detected protrusion 95 and second detected protrusion 96 also rotate in the rotating direction R and move gradually leftward.

Figure 21:
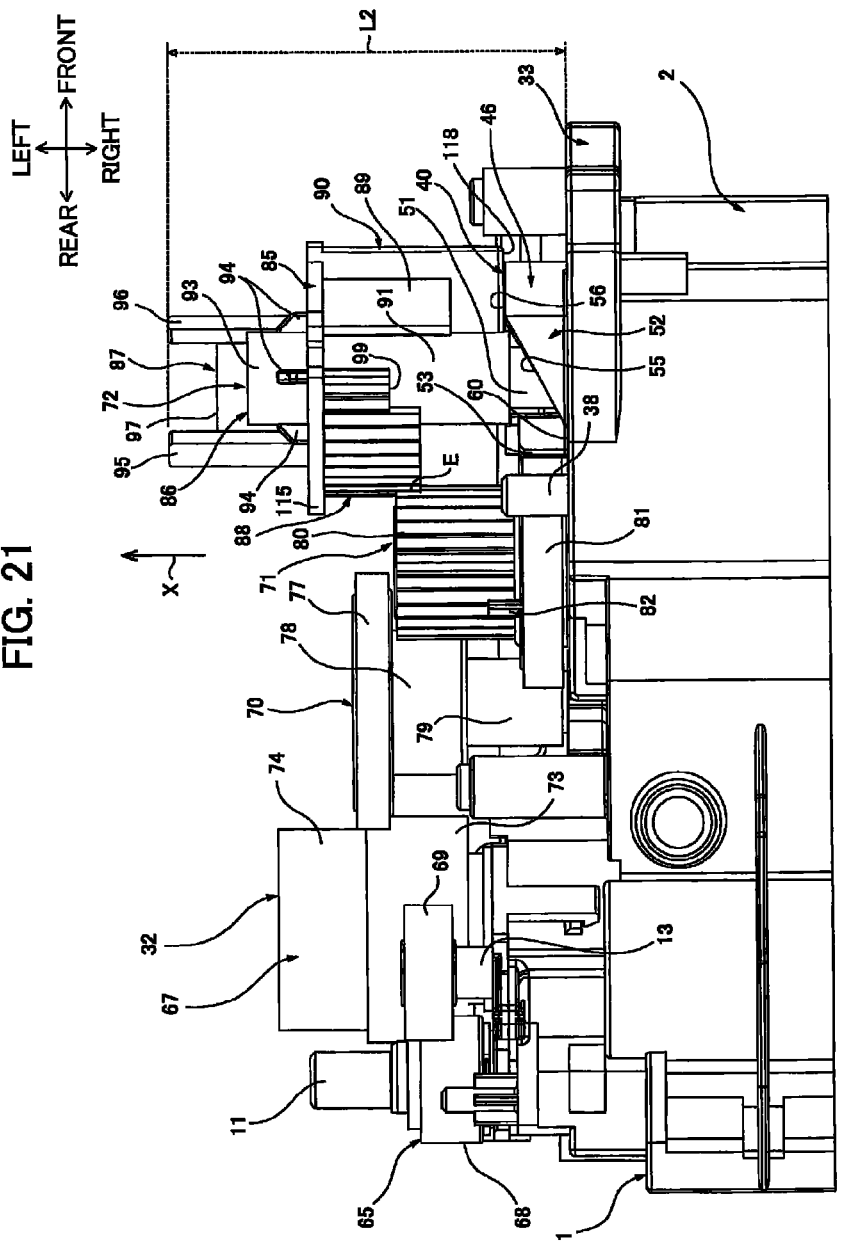
FIG. 21 is a bottom view of the gear train shown in FIG. 12, showing the sensor gear according to the first embodiment in its advanced position.

As the sensor gear 72 rotates further in the rotating direction R, the sliding part 118 provided on the guide rib 90 of the sensor gear 72 moves from the first sloped surface 55 onto the level surface 56, as illustrated in FIGS. 20 and 21. As a result, the sensor gear 72 moves farther in the first direction X until arriving its advanced position, which is its farthest position from the left wall 33.

When the sensor gear 72 is in the advanced position, the distance in the left-right direction from the left end of the first detected protrusion 95 to the left wall 33 is defined as an advanced distance L2, as shown in FIG. 21.

At this time, the left ends of the first detected protrusion 95 and second detected protrusion 96 protrude through the detected-part insertion hole 109 of the second cover 102 to a position farther leftward than the left endface of the circumferential wall 106. In contrast, the linking part 97 does not protrude leftward from the detected-part insertion hole 109 but remains in a position rightward from the left endface of the circumferential wall 106.

When the sensor gear 72 rotates in the advanced position, the sliding part 118 on the guide rib 90 moves in the rotating direction R while sliding over the level surface 56, and the first detected protrusion 95 also moves in the rotating direction R, as shown in FIG. 12. While moving in the rotating direction R, the outer radial end of the first detected protrusion 95 contacts the lower end of the contact lever 192 from the front side thereof, pushing the lower end of the contact lever 192 rearward. At this time, the actuator 191 pivots from the non-detection position to the detection position. Accordingly, the optical sensor (not shown) detects that the actuator 191 has pivoted from the non-detection position to the detection position and outputs an ON signal, whereby the sensor mechanism 190 detects the first detected protrusion 95.

As the sensor gear 72 continues to rotate, the first detected protrusion 95 separates from the contact lever 192, allowing the actuator 191 to return to the non-detection position. As a result, the optical sensor detects that the actuator 191 has pivoted from the detection position to the non-detection position and switches the ON signal to an OFF signal. At this time, the linking part 97 is positioned on the right side of the contact lever 192, with a gap formed therebetween.

As the sensor gear 72 continues to rotate, the outer radial end of the second detected protrusion 96 contacts the lower end of the contact lever 192 from the front side thereof and pushes the lower end of the contact lever 192 rearward. Accordingly, the actuator 191 again pivots from the non-detection position to the detection position, and the optical sensor detects that the actuator 191 has pivoted to the detection position. Accordingly, the optical sensor outputs an ON signal by which the sensor mechanism 190 detects the second detected protrusion 96.

Figure 22:
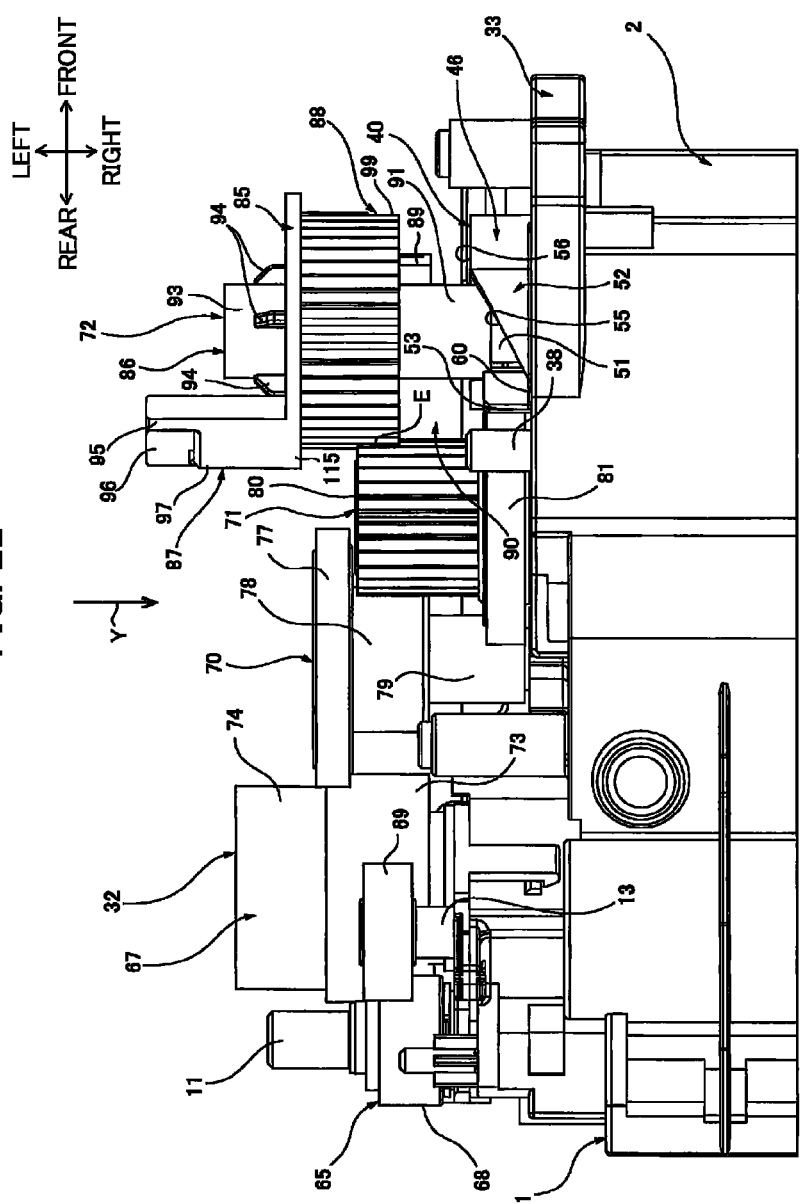
FIG. 22 is a bottom view of the gear train shown in FIG. 13, showing the first detected protrusion and the linking part of the sensor gear according to the first embodiment passing leftward of the first gear part of the agitator gear.

At this time, the first detected protrusion 95 and linking part 97 pass through a region positioned leftward of the front end portion of the first gear part 80, as illustrated in FIG. 22.

Figure 13:
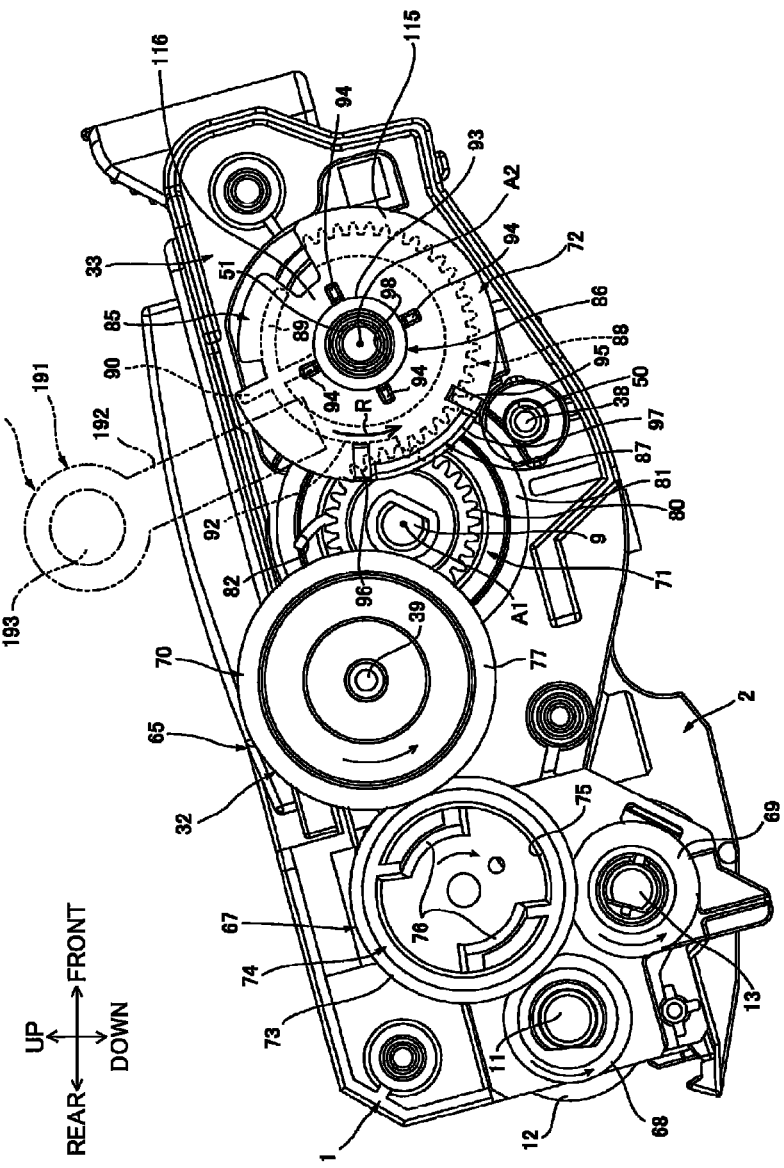
FIG. 13 is a fifth explanatory diagram illustrating the operation of the sensor unit according to the first embodiment for detecting a new product when the first detected protrusion and a linking part of the sensor gear pass leftward of the first gear part of the agitator gear.

As the sensor gear 72 continues to rotate, the second detected protrusion 96 separates from the contact lever 192, as shown in FIG. 13, enabling the actuator 191 to return again to the non-detection position. Consequently, the optical sensor detects the actuator 191 pivoting from the detection position to the non-detection position and switches its output signal from an ON signal to an OFF signal.

Figure 17:
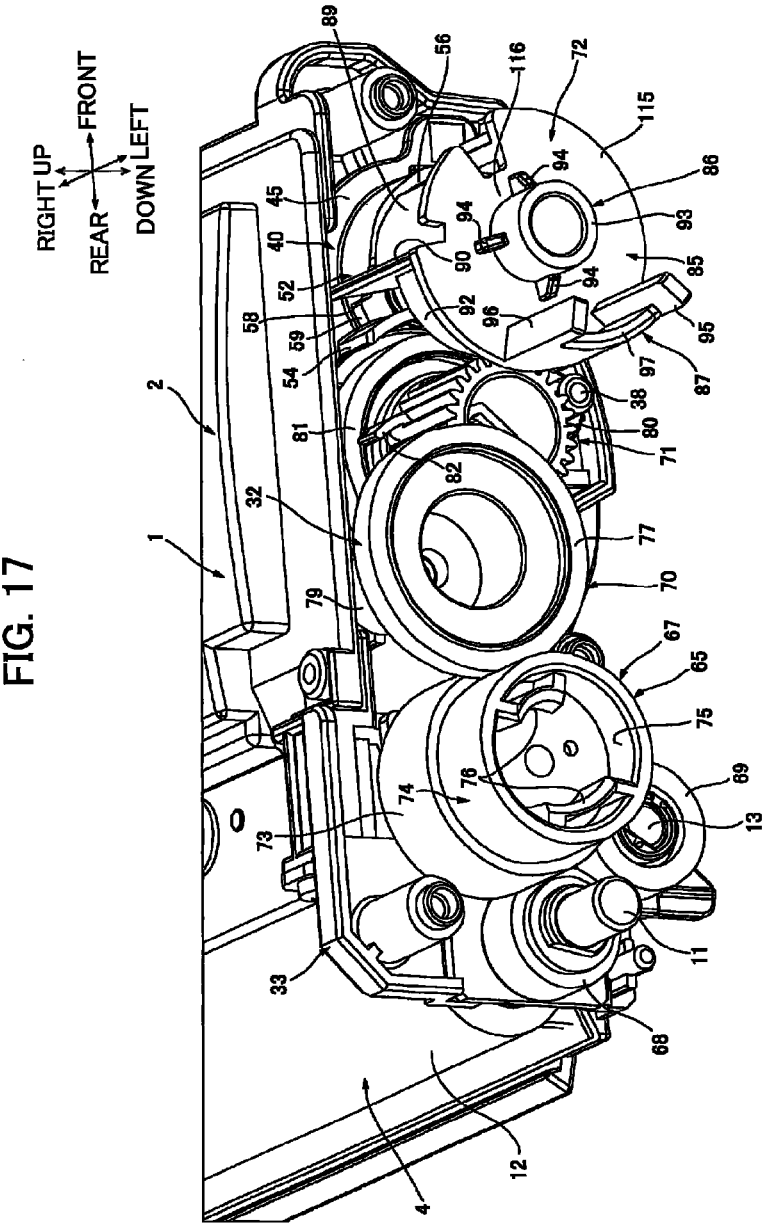
FIG. 17 is a perspective view of the gear train shown in FIG. 13 from the upper left side thereof, wherein the first detected protrusion and the linking part of the sensor gear according to the first embodiment pass leftward of the first gear part of the agitator gear.

As the sensor gear 72 continues to rotate, the sliding part 118 of the guide rib 90 transitions from the level surface 56 to the second sloped surface 57, as illustrated in FIG. 17.

Accordingly, the sliding part 118 moves gradually rightward as the sensor gear 72 rotates while sliding over the second sloped surface 57. Thus, while rotating, the sensor gear 72 gradually moves in the second direction Y (i.e., rightward) so as to approach the left wall 33. Consequently, the first detected protrusion 95 and second detected protrusion 96 also move gradually rightward while rotating in the rotating direction R.

Figure 18:
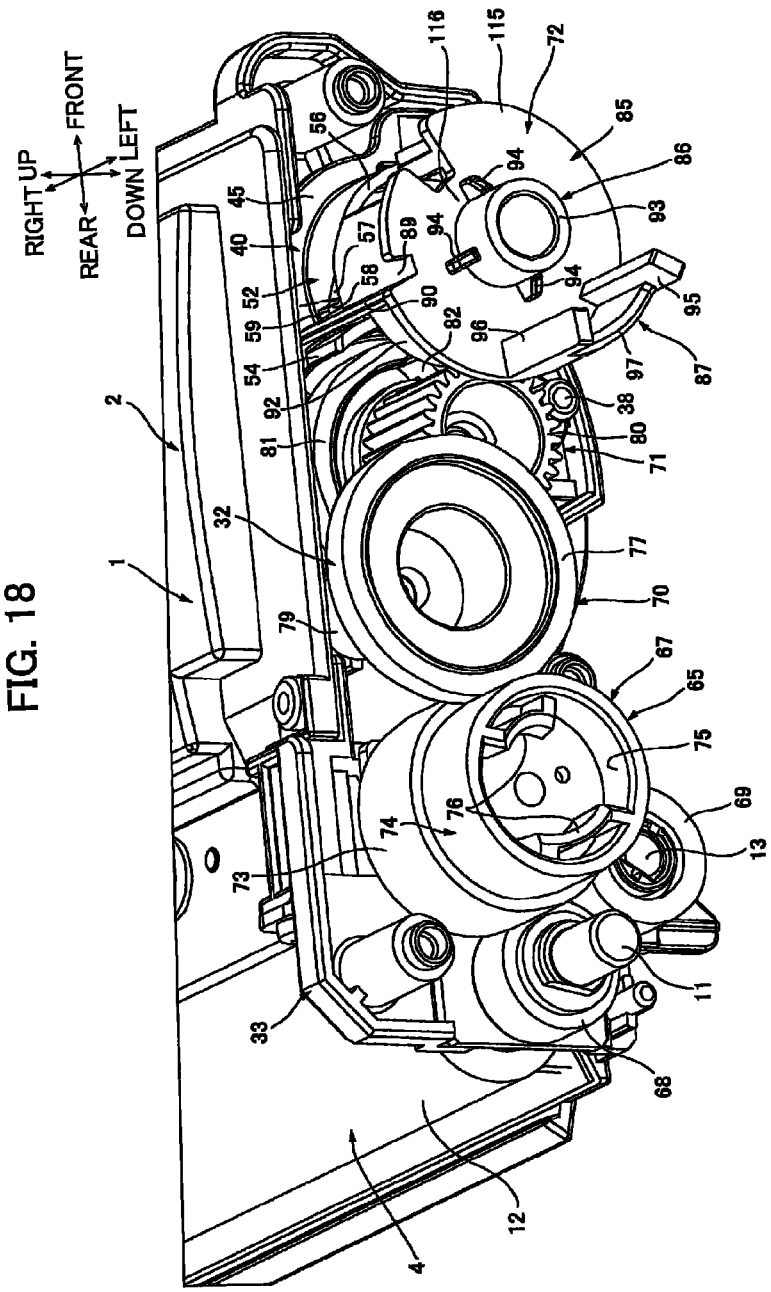
FIG. 18 is a perspective view of the gear train shown in FIG. 14 from the upper left side, wherein the sensor gear according to the first embodiment is in its terminal position.

As the sensor gear 72 continues to rotate, the sliding part 118 of the guide rib 90 reaches the junction between the second sloped surface 57 and cutout surface 58 and opposes the protruding part 59 in the left-right direction, as shown in FIG. 18. At this time, the urging force of the spring member 100 quickly moves the sensor gear 72 in the second direction Y (i.e., rightward) until the sliding part 118 of the guide rib 90 contacts the left surface of the protruding part 59. As a result, the first detected protrusion 95 and second detected protrusion 96 also move rightward until their left endfaces are approximately flush with the left endface of the circumferential wall 106, as shown in FIG. 3.

Figure 14:
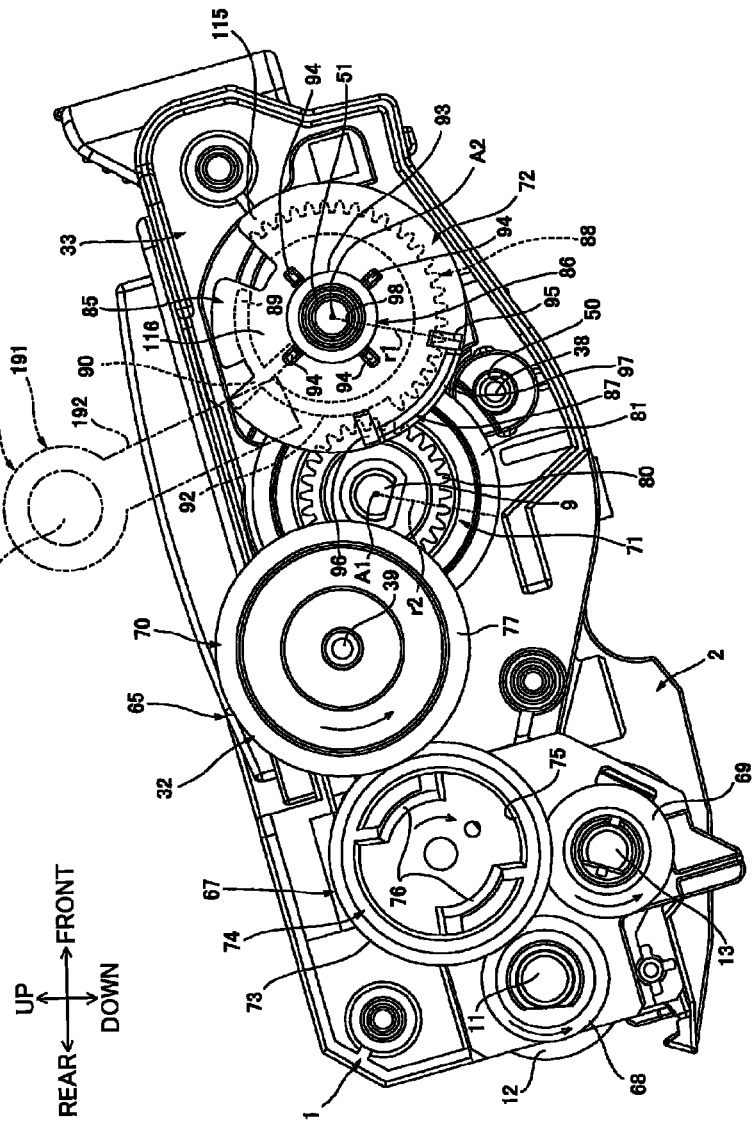
FIG. 14 is a sixth explanatory diagram illustrating the operation of the sensor unit according to the first embodiment for detecting a new product when the sensor gear according to the first embodiment is in its terminal position.

As a result of this operation, the sensor gear part 88 of the sensor gear 72 disengages from the first gear part 80 of the agitator gear 71, bringing the rotation of the sensor gear 72 to a halt, as illustrated in FIG. 14. At this time, the sensor gear 72 is in its terminal position, ending the rotating operation. When the sensor gear 72 is in this terminal position, the distance in the left-right direction between the left end of the first detected protrusion 95 and the left wall 33 is defined as a terminal distance L3 shown in FIG. 23. The terminal distance L3 is greater than the initial distance L1 shown in FIG. 19. In other words, the sensor gear 72 is separated farther from the left wall 33 in the terminal position than in the initial position.

Figure 23:
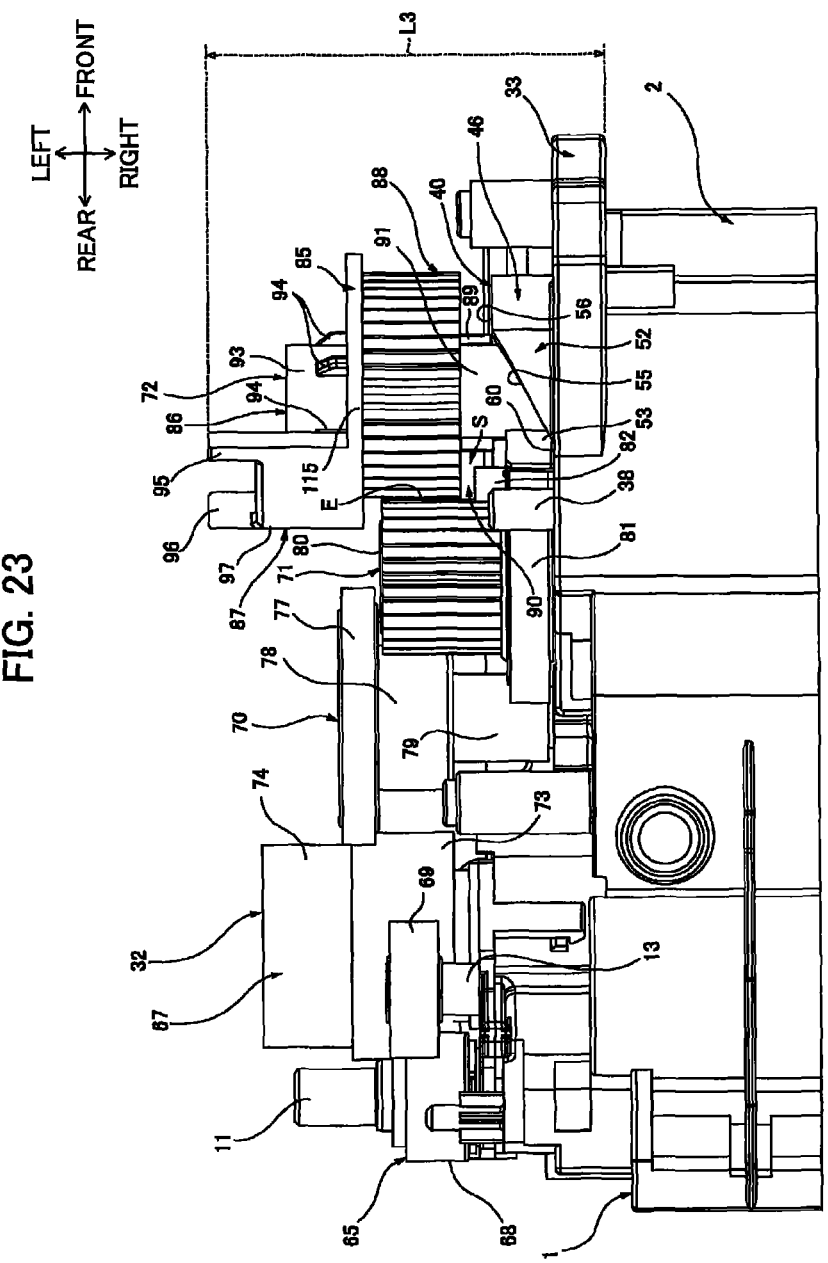
FIG. 23 is a bottom view of the gear train shown in FIG. 14, showing the sensor gear according to the first embodiment in its terminal position.

Therefore, as shown in FIG. 23, a gap S in the left-right direction that is larger than the left-right dimension of the first engaging part 82 can be formed between the sensor gear part 88 and second gear part 81 and between the connecting part 92 and second gear part 81. Hence, if the agitator gear 71 rotates while the sensor gear 72 is in the terminal position, the first engaging part 82 passes through the gap S. As shown in FIG. 14, the guide rib 90 of the sensor gear 72 is now positioned on the upper front side of the agitator gear 71 and is not in the path of the first engaging part 82 during rotations of the agitator gear 71.

Further, when the sensor gear 72 is in the terminal position, the right portion of the guide rib 90 is positioned between the second stopper 54 and the cutout surface 58 with respect to the rotating direction R, as shown in FIG. 18. Specifically, the second stopper 54 is positioned adjacent to the guide rib 90 on the downstream side in the rotating direction R when the sensor gear 72 is in the terminal position and restricts the sensor gear 72 from rotating downstream in the rotating direction R. Further, the cutout surface 58 of the guide part 52 is positioned adjacent to the guide rib 90 on the upstream side in the rotating direction R and restricts the sensor gear 72 from rotating upstream in the rotating direction R. With this configuration, the sensor gear 72 is retained in the terminal position and maintained motionless, irrespective of the rotation of the agitator gear 71.

When the sensor gear 72 is in the terminal position shown in FIG. 14, the outer radial portion of the second detected protrusion 96 overlaps the front end portion of the first gear part 80 of the agitator gear 71 when viewed in the first direction X, and the first detected protrusion 95 is disposed on the lower front side of the agitator gear 71 with a gap formed therebetween.

Further, as also shown in FIG. 14, when the sensor gear 72 rotates, the first detected protrusion 95 traces a path having a radius of curvature r1 that is equal in length to a line segment connecting the center axis A2 of the sensor-gear support shaft 51 and the outer radial end of the first detected protrusion 95 in the radial direction of the sensor gear 72, and that is greater than a radius r2 of the second gear part 81. The radius of curvature for the path traced by the second detected protrusion 96 when the sensor gear 72 rotates is equivalent to the radius of curvature r1.

As described above, when a new developing cartridge 1 is first mounted in the main casing 16, the optical sensor (not shown) will output an ON signal twice. Accordingly, if the optical sensor outputs two ON signals after the developing cartridge 1 is mounted in the main casing 16, the microcomputer (not shown) can determine that the developing cartridge 1 is new.

On the other hand, when a used developing cartridge 1, i.e., a developing cartridge 1 that has been previously mounted in the main casing 16 is again mounted in the main casing 16, the first engaging part 82 will not contact the second engaging part 89 when the agitator gear 71 rotates, but will pass through the gap S. Therefore, the sensor gear 72 does not rotate even when the control unit initiates the warm-up operation for the printer 15. Accordingly, when the optical sensor does not output an ON signal within a prescribed time interval after the developing cartridge 1 has been mounted in the main casing 16, the microcomputer can determine that the developing cartridge 1 is used.

(5-3) Operations for Removing the Developing Cartridge from the Main Casing

As described above, the sensor gear 72 is disposed in its terminal position when the developing cartridge 1 is used. At this time, the first detected protrusion 95 and second detected protrusion 96 are accommodated inside the circumferential wall 106 constituting the second cover 102 such that their left endfaces are approximately flush with the left endface of the circumferential wall 106, as illustrated in FIG. 3.

In order to remove a used developing cartridge 1 from the main casing 16, the operator performs the operations for mounting the developing cartridge 1 described above in reverse.

Specifically, the operator opens the front cover 21, as shown in FIG. 2, and pulls the developing cartridge 1 forward and out of the main casing 16. This completes the operations for removing the developing cartridge 1 from the main casing 16.

6. Operational Advantages (1) In the developing cartridge 1 according to the depicted first embodiment, the detected part 87 (more specifically, the radially outer portions of the first detected protrusion 95 and the second detected protrusion 96 and the linking part 97) is disposed on the peripheral part 115 of the sensor gear 72, as shown in FIG. 9. In other words, the radially outer portions of the first detected protrusion 95 and the second detected protrusion 96 are positioned farther from the center axis A2, which is the rotational axis of the sensor gear 72, than the sensor gear part 88 brought into contact with the first gear part 80 from the center axis A2.

This structure can increase the distance by which the detected part 87 displaces as the sensor gear 72 rotates from the initial position to the terminal position, as shown in FIGS. 9 through 14. As a result, sufficient amount of displacement of the detected part 87 can be obtained in spite of downsizing of the developing cartridge 1.

Accordingly, improvement on detection accuracy in the sensor mechanism 190 can be attained along with the downsizing of the developing cartridge 1.

(2) When the sensor gear 72 is in the terminal position shown in FIG. 14, the second detected protrusion 96 is arranged to overlap the front end portion of the first gear part 80 as viewed in the first direction X.

In other words, during movement from the initial position to the terminal position, the sensor gear 72 is ensured to rotate so that the first detected protrusion 95 and the linking part 97 have passed leftward of the first gear part 80 until the second detected protrusion 96 overlaps the first gear part 80 as viewed in the first direction X.

Thus, as shown in FIGS. 9 through 14, increased rotation angle of the sensor gear 72 can be obtained when the sensor gear 72 rotates from the initial position to the terminal position, thereby further increasing the displacement amount of the detected part 87. As a result, sensing accuracy can be reliably improved while realizing downsizing.

(3) While rotating from its initial position toward its terminal position, the sensor gear 72 first moves in the first direction X away from the left wall 33 and, after remaining in its advanced position which is the farthest position from the left wall 33, moves in the second direction Y toward the left wall 33, as illustrated in FIGS. 19 through 23.

In other words, the sensor gear 72 is configured to be positioned away from the left wall 33 during the process of transitioning from its initial position to its terminal position as shown in FIG. 21, and disposed near the left wall 33 when in its initial position and terminal position, as shown in FIGS. 19 and 23.

By configuring the sensor mechanism 190 to detect the first detected protrusion 95 and second detected protrusion 96 when the sensor gear 72 is in its advanced position as shown in FIG. 12, the first detected protrusion 95 and the second detected protrusion 96 can be detected at their farthest position from the left wall 33 by the sensor mechanism 190.

As a result, sensing precision of the first detected protrusion 95 and second detected protrusion 96 by the sensor mechanism 190 can be further improved.

Since the sensor gear 72 is disposed near the left wall 33 when in its initial position and terminal position shown in FIGS. 19 and 23, respectively, the detected part 87 is less likely to interfere with external members during mounting or removal of the developing cartridge 1 relative to the main casing 16, thereby avoiding damage to the first detected protrusion 95 and second detected protrusion 96.

(4) As illustrated in FIGS. 19 and 23, the terminal distance L3 between the left edge of the first detected protrusion 95 and the left wall 33 when the sensor gear 72 is in its terminal position is longer than the initial distance L1 between the left edge of the first detected protrusion 95 and the left wall 33 in the left-right direction when the sensor gear 72 is in its initial position.

In other words, the sensor gear 72 is positioned farther away from the left wall 33 in the first direction X and, hence, farther away from the agitator gear 71 provided on the left wall 33 in the first direction X in its terminal position than in its initial position. As a result, unintended interference of the sensor gear 72 in its terminal position (i.e., the sensor gear 72 whose rotation has terminated) with the agitator gear 71 can be suppressed.

(5) As shown in FIG. 8B, the protruding part 59 protrudes leftward than the contact surface 60 in the first direction X. Put another way, the protruding part 59 is positioned father from the left wall 33 than the contact surface 60 from the contact surface 60 in the first direction X, or the protruding part 59 is positioned downstream than the contact surface 60 in the first direction X. Further, as shown in FIG. 18, the left surface of the protruding part 59 is in contact with the right end (sliding part 118) of the guide rib 90 of the sensor gear 72 in the terminal position in the first direction X.

Accordingly, this configuration can more reliably separate the sensor gear 72 in the terminal position away from the left wall 33 in the first direction X than the sensor gear 72 in the initial position from the left wall 33. Consequently, the sensor gear 72 in the terminal position can be reliably separated from the agitator gear 71 in the first direction X, more reliably preventing unintended interference between the agitator gear 71 and the sensor gear 72 in the terminal position.

(6) The agitator gear 71 is provided with the first engaging part 82. As shown in FIG. 10, when the agitator gear 71 rotates, the first engaging part 82 is brought into abutment with the second engaging part 89 of the sensor gear 72 in the initial position.

Here, the sensor gear 72 is positioned closer to the agitator gear 71 in the first direction X when the sensor gear 72 is in its initial position than in its terminal position, as shown in FIGS. 19 and 23. Therefore, the first engaging part 82 reliably engages the sensor gear 72 in its initial position.

Upon engagement of the first engaging part 82 with the sensor gear 72 in the initial position, the sensor gear 72 starts to rotate to bring the sensor gear part 88 and the first gear part 80 into meshing engagement with each other, as shown in FIG. 11. Accordingly, the sensor gear part 88 can be intermeshed with the first gear part 80 at a desired timing.

Further, the first engaging part 82 is positioned upstream of the portion E of the first gear part 80 that is intermeshed with the sensor gear part 88 in the first direction X, as illustrated in FIG. 20. This arrangement prevents the first engaging part 82 from interfering with the sensor gear part 88 when the agitator gear 71 rotates, thereby ensuring that both the agitator gear 71 and sensor gear 72 can be driven to rotate smoothly.

(7) As shown in FIG. 9, the agitator gear 71 is provided with the first gear part 80 and second gear part 81. With this configuration, the agitator gear 71 can reliably receive a drive force transmitted from the development coupling 67 through the second gear part 81 and can reliably transmit the drive force to the sensor gear 72 through the first gear part 80 and sensor gear part 88.

The sensor gear 72 is also provided with the second engaging part 89. When the sensor gear 72 is in the initial position, the second engaging part 89 is disposed to overlap the second gear part 81 as viewed in the first direction X and positioned downstream than the second gear part 81 in the first direction X, as shown in FIG. 19. This construction ensures an efficient layout of the second engaging part 89 and second gear part 81 while ensuring that the first engaging part 82 on the agitator gear 71 stably engages with the second engaging part 89 of the sensor gear 72 when the agitator gear 71 rotates. Thus, this arrangement reliably places the sensor gear part 88 and first gear part 80 in meshing engagement with each other at a desired timing while achieving a compact developing cartridge 1.

(8) As shown in FIG. 19, the first engaging part 82 is formed continuously with each of the outer circumferential surface of the first gear part 80 and the left surface of the second gear part 81. Accordingly, through a simple construction, the rigidity of the first engaging part 82 can be enhanced and the first engaging part 82 can be more reliably engaged with the second engaging part 89.

(9) The sensor gear 72 is provided with the guide rib 90. As shown in FIG. 19, the guide rib 90 is positioned adjacent to and downstream of the first stopper 53 in the rotating direction R when the sensor gear 72 is in the initial position, while the guide rib 90 is positioned adjacent to and upstream of the second stopper 54 in the rotating direction R when the sensor gear 72 is in the terminal position, as shown in FIG. 18.

With this structure, the first stopper 53 can restrict the sensor gear 72 from moving upstream in the rotating direction R from its initial position, and the second stopper 54 can restrict the sensor gear 72 from moving downstream in the rotating direction R from its terminal position. Accordingly, unintended rotation of the sensor gear 72 can be reliably restricted.

Further, the guide rib 90 is elongated in the radial direction of the agitator gear 71 and both the first stopper 53 and second stopper 54 extend in the circumferential direction of the agitator gear 71. This structure realizes an efficient layout of the first stopper 53 and second stopper 54 around the periphery of the agitator gear 71.

When the sensor gear 72 is in the initial position or the terminal position, the guide rib 90 is oriented to extend in the approximate same direction as the first stopper 53 and second stopper 54. Thus, the developing cartridge 1 can be made compact while further restraining unintended rotation of the sensor gear 72.

(10) As shown in FIGS. 9 through 14, the radius of curvature r1 for the path that the first detected protrusion 95 follows when the sensor gear 72 rotates is greater than the radius r2 of the second gear part 81.

This construction further increases the distance that the first detected protrusion 95 is displaced as the sensor gear 72 rotates.

(11) As shown in FIG. 16, the sensor gear part 88 has the cutout part 99. While the sensor gear 72 is in its initial position, the first engaging part 82 passes through the cutout part 99 when the agitator gear 71 rotates. Thus, even when the first engaging part 82 is arranged such that its path of movement overlaps the sensor gear part 88 of the sensor gear 72 when the sensor gear 72 is in the initial position in order to make the developing cartridge 1 more compact, interference between the first engaging part 82 and sensor gear part 88 can be prevented.

(12) As shown in FIG. 4, the sensor unit 32 includes the spring member 100. The spring member 100 urges the sensor gear 72 toward the cap 40 in a direction parallel to the first direction X. This configuration improves the precision in which the sensor gear 72 is positioned relative to the left wall 33 when the sensor gear 72 is in its initial position and terminal position.

While the sensor gear 72 rotates from its initial position toward its terminal position, the guide rib 90 of the sensor gear 72 is reliably brought into contact with the guide part 52 of the cap 40 due to the urging force of the spring member 100. Consequently, with the guide rib 90 reliably guided long the guide part 52, the sensor gear 72 is ensured to move with respect to the left-right direction (in the first direction X and second direction Y) while rotating from the initial position to the terminal position.

Further, the anchoring part 86 of the sensor gear 72 anchors the spring member 100, and thus the sensor gear 72 supports the spring member 100. Accordingly, after the sensor gear 72 is assembled on the left wall 33, the spring member 100 can easily be interposed between the second cover 102 and sensor gear 72 in the first direction X by mounting the second cover 102 on the left wall 33 from the downstream side in the first direction X.

It should be noted here that, in the depicted embodiment, the sensor gear 72 having a generally circular side view is an example of the detected body of the present invention. Therefore, when referring to the "radial direction" of the sensor gear 72, the "radial direction" corresponds to a direction parallel to a radius of the sensor gear 72. However, if the detected body is a rotatable body having a shape other than a circular shape in a side view, the "radial direction" may mean a direction parallel to a direction from its rotational center toward an outermost peripheral end of the detected body.

7. Second Embodiment

A construction according to a second embodiment of the present invention will be described with reference to FIGS. 24A and 24B.

Figure 24A:
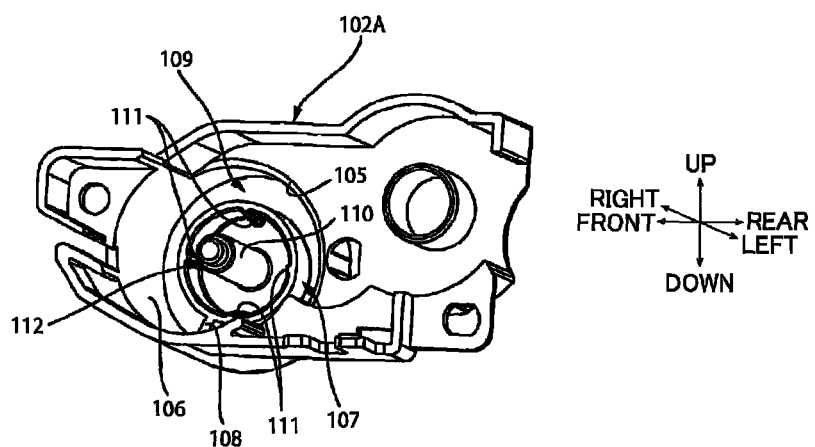
FIG. 24A is a perspective view of a second cover according to a second embodiment of the present invention from the lower right side thereof.
Figure 24B:
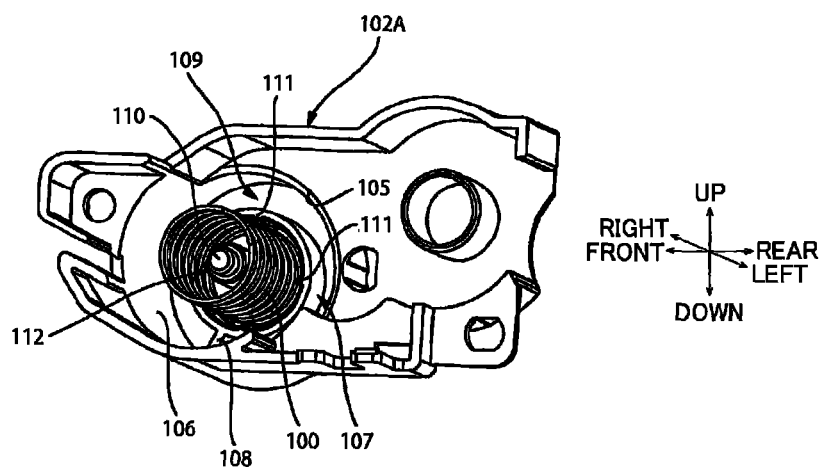
FIG. 24B is a perspective view of the second cover according to the second embodiment from the lower right side thereof, showing the second cover supporting a spring member.

Parts and components in FIGS. 24A and 24B corresponding to those in FIGS. 1 through 23 are designated with the same reference numerals as those of the first embodiment in order to avoid duplicating description.

In the first embodiment described above, the sensor gear 72 supports the spring member 100 as shown in FIG. 4. Instead, in the second embodiment, a second cover 102A supports the spring member 100, as shown in FIG. 24B.

Specifically, as shown in FIG. 24A, the second cover 102A according to the second embodiment has an anchoring part 112 for anchoring the spring member 100. The anchoring part 112 includes an insertion shaft 110, and four anchoring protrusions 111. The insertion shaft 110 has a general columnar shape that is arranged coaxially with the receiving part 107. The insertion shaft 110 is disposed inside the receiving part 107 on the inner (i.e., right) surface formed on the left end of the receiving part 107, and protrudes rightward from an approximate center region on the right surface.

The four anchoring protrusions 111 are arranged at approximate 90-degree intervals around an inner circumferential surface of the receiving part 107. The anchoring protrusions 111 have a general rectangular shape in a side view and protrude radially inward from the inner circumferential surface respectively. The anchoring protrusions 111 are also elongated in the left-right direction.

The receiving part 107 receives the left end of the spring member 100 with the insertion shaft 110 being received inside the spring member 100 and the left end of the spring member 100 being engaged with the anchoring protrusions 111. Accordingly, the spring member 100 is anchored by the anchoring part 112 and supported on the second cover 102A.

In order to assemble the second cover 102A supporting the spring member 100 to the housing 2, first the gear train 65 and the first cover 101 are assembled on the left wall 33, as described above.

Next, the second cover 102A supporting the spring member 100 is assembled onto the front portion of the gear train 65 from the left side thereof such that the boss 93 of the sensor gear 72 is received in the right end of the spring member 100. At this time, the right end of the insertion shaft 110 is inserted through the left endface of the boss 93 into the sensor-gear support shaft 51 of the cap 40.

Through this assembly operation, the spring member 100 is interposed between the plate-shaped part 85 of the sensor gear 72 and the left endface (inner surface formed on the left end) of the receiving part 107. Thus the urging force of the spring member 100 constantly urges the sensor gear 72 rightward, i.e., toward the cap 40.

Next, the second cover 102A is fastened to the left wall 33 with screws. This completes the operation of assembling the second cover 102A supporting the spring member 100 to the left wall 33.

In the above-described configuration of the second embodiment, the spring member 100 urges the sensor gear 72 toward the cap 40 in the first direction X.

Hence, this configuration improves the precision in positioning the sensor gear 72 relative to the left wall 33 when the sensor gear 72 is in the initial position and terminal position.

When the sensor gear 72 rotates from the initial position toward the terminal position, the guide rib 90 of the sensor gear 72 is made to reliably contact the guide part 52 of the cap 40 due to the urging force of the spring member 100. With this configuration, the guide rib 90 is reliably guided by the guide part 52 so that the sensor gear 72 reliably moves leftward and rightward while rotating from the initial position to the terminal position.

Further, the anchoring part 112 of the second cover 102A anchors the spring member 100 so that the second cover 102A can support the spring member 100. Accordingly, after assembling the gear train 65 and first cover 101 to the left wall 33, the spring member 100 can easily be interposed between the second cover 102A and sensor gear 72 in the first direction X by assembling the second cover 102A on the left wall 33 from the downstream side in the first direction X.

The structure of the second embodiment can obtain the same operational advantages as those described above in the first embodiment.

8. Third Embodiment

A construction according to a third embodiment of the present invention will be described with reference to FIG. 25.

Figure 25:
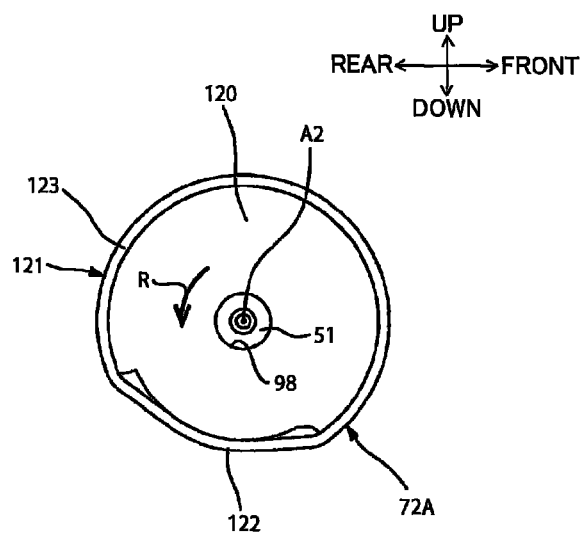
FIG. 25 is a left side view of a body part and a resistance-applying member of a sensor gear according to a third embodiment of the present invention.

Parts and components in FIG. 25 corresponding to those in FIGS. 1 through 23 are designated with the same reference numerals as those of the first embodiment in order to avoid duplicating description.

In the first embodiment described above, the sensor gear 72 has the sensor gear part 88. However, in the third embodiment shown in FIG. 25, a sensor gear 72A has a body part 120, and a resistance-applying member 121 in place of the sensor gear part 88.

The body part 120 has a fan-like shape that is centered on the center axis A2 of the sensor-gear support shaft 51. The resistance-applying member 121 is formed of a material having a relatively high coefficient of friction, such as rubber, and is wound around an outer peripheral surface of the body part 120. Owing to the shape of the body part 120, the outer peripheral surface formed by the resistance-applying member 121 includes a recessed portion 122 that is recessed inward in a radial direction of the body part 120, and a contact portion 123 constituting a portion of the outer peripheral surface excluding the recessed portion 122. The body part 120 and resistance-applying member 121 are formed of a size and shape that enable the contact portion 123 to contact the first gear part 80 of the agitator gear 71 while preventing the recessed portion 122 from contacting the first gear part 80. In this example, gear teeth may be provided or not provided around the circumferential surface of the first gear part 80.

As in the first embodiment, this configuration of the third embodiment can transmit a drive force inputted into the development coupling 67 to the sensor gear 72A through the idle gear 70 and agitator gear 71 for rotating the sensor gear 72A in the rotating direction R.

Accordingly, the depicted structure of the third embodiment can obtain the same operational advantages as those described above in the first and second embodiments.

9. Fourth Embodiment

Next, a construction according to a fourth embodiment of the present invention will be described with reference to FIG. 26A.

Figure 26A:
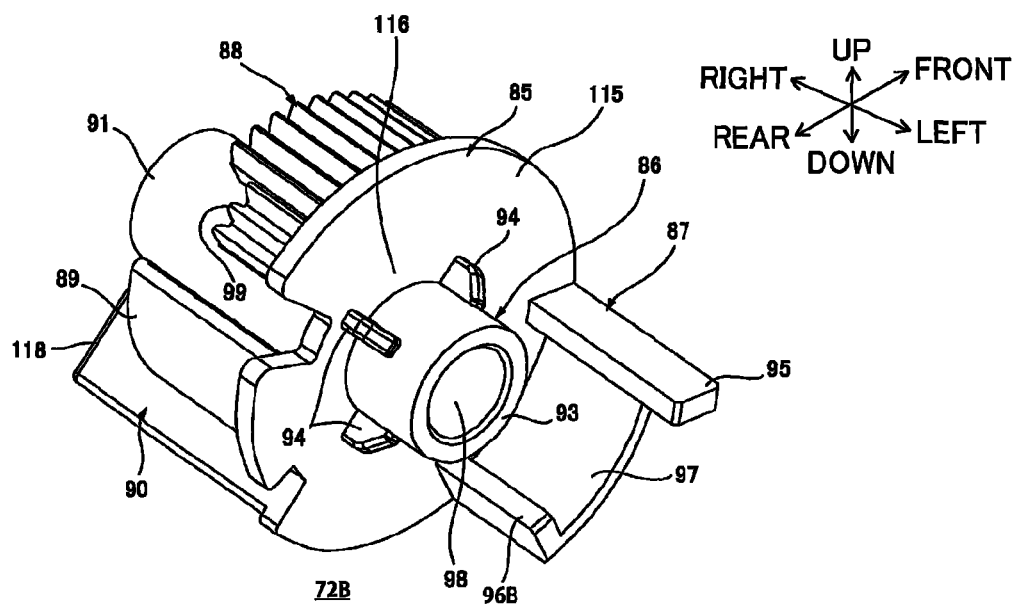
FIG. 26A is a perspective view of a sensor gear according to a fourth embodiment of the present invention from the left rear side thereof.

Parts and components in FIG. 26A corresponding to those in FIGS. 1 through 23 are designated with the same reference numerals as those of the first embodiment in order to avoid duplicating description.

In the sensor gear 72 of the first through third embodiments described above, the first detected protrusion 95 and second detected protrusion 96 are each configured to contact the actuator 191 as the sensor gear 72 rotates.

In a sensor gear 72B according to the fourth embodiment, on the other hand, only the first detected protrusion 95 is configured to contact the actuator 191 when the sensor gear 72B rotates.

Specifically, as illustrated in FIG. 26A, the first detected protrusion 95 has the left-right dimension greater than that of the linking part 97 as in the foregoing embodiments, while a second detected protrusion 96B has a left-right dimension approximately equal to that of the linking part 97.

When a new developing cartridge 1 having the sensor gear 72B is mounted in the main casing 16, only the first detected protrusion 95 contacts the actuator 191 and, hence, the optical sensor only outputs one ON signal. Thus, if the optical sensor outputs an ON signal only once when the developing cartridge 1 is mounted in the main casing 16, the microcomputer can determine that the developing cartridge 1 is a new product.

Alternatively, the number of ON signals outputted by the optical sensor may also be used to determine the type (specifications) of the developing cartridge 1. For example, the housing 2 of the developing cartridge 1 may be determined to have a relatively large capacity for toner when both the first detected protrusion 95 and second detected protrusion 96 contact the contact lever 192, and to have a relatively small capacity for toner when only the first detected protrusion 95 contacts the contact lever 192.

Thus, if the developing cartridges 1 of different types can be selectively mounted in the main casing 16, the microcomputer can distinguish the type of developing cartridge 1 based on the number of ON signals outputted from the optical sensor when a new developing cartridge 1 is mounted in the main casing 16.

It is also possible to configure only the second detected protrusion 96 to contact the actuator 191. In this case, the left-right dimension of the first detected protrusion 95 is substantially equivalent to that of the linking part 97, while the left-right dimension of the second detected protrusion 96 is greater than that of the linking part 97. This configuration also enables the microcomputer to distinguish the type of developing cartridge 1.

The depicted structure of the fourth embodiment can obtain the same operational advantages as those described above in the first through third embodiments.

10. Fifth Embodiment

Now, a construction according to a fifth embodiment of the present invention will be described with reference to FIG. 26B.

Figure 26B:
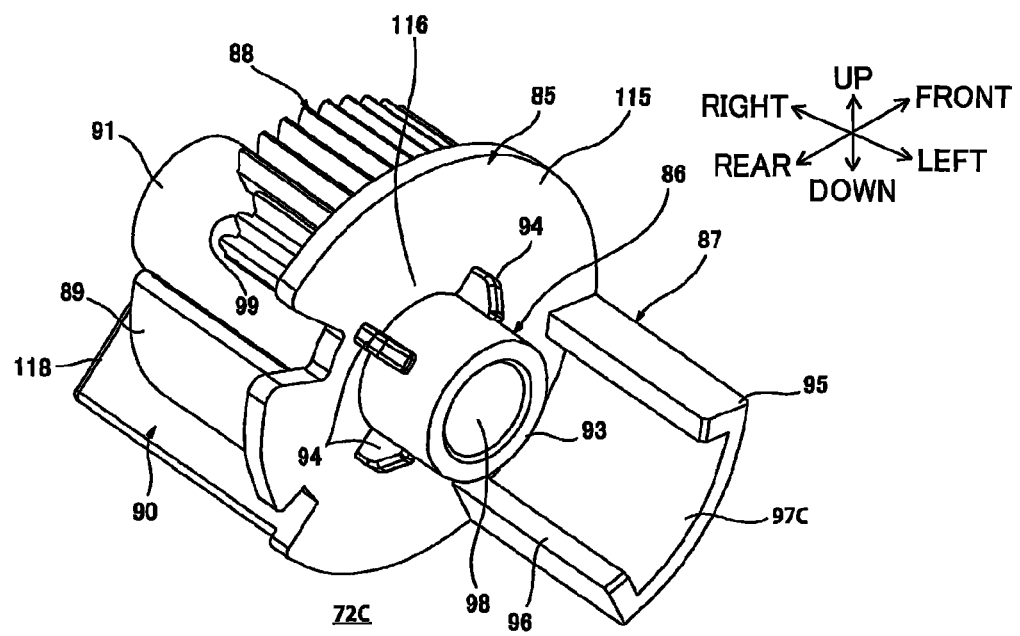
FIG. 26B is a perspective view of a sensor gear according to a fifth embodiment of the present invention from the left rear side thereof.

Parts and components in FIG. 26B corresponding to those in FIGS. 1 through 23 are designated with the same reference numerals as those of the first embodiment in order to avoid duplicating description.

In a sensor gear 72C according to the fifth embodiment, a linking part 97C is also configured to contact the actuator 191 as the sensor gear 72C rotates, in addition to the first detected protrusion 95 and second detected protrusion 96.

Specifically, as shown in FIG. 26B, the linking part 97C of the fifth embodiment has a left-right dimension substantially equivalent to those of the first detected protrusion 95 and second detected protrusion 96.

When a new developing cartridge 1 having the sensor gear 72C is mounted in the main casing 16, the first detected protrusion 95, linking part 97C, and second detected protrusion 96 sequentially contact the contact lever 192 as the sensor gear 72C rotates. Thus, after the first detected protrusion 95 contacts the contact lever 192, the actuator 191 remains in the detection position until the second detected protrusion 96 disengages from the contact lever 192. Consequently, the optical sensor outputs a continuous ON signal for a longer duration than when one of either the first detected protrusion 95 or second detected protrusion 96 alone is configured to contact the contact lever 192.

With the developing cartridge 1 having the sensor gear 72C according to the fifth embodiment, the microcomputer can distinguish the type (specifications) of the developing cartridge 1 based on the duration of the ON signal outputted from the optical sensor when a new developing cartridge 1 is mounted in the main casing 16.

Further, the structure of the fifth embodiment can obtain the same operational advantages as those described above in the first through fourth embodiments.

11. Variations and Modifications (1) In the first through fifth embodiments described above, the optical sensor is configured to output an OFF signal when detecting that the actuator 191 has pivoted from the detection position to the non-detection position, but the optical sensor may be configured to halt output of its ON signal instead.

(2) In the first through fifth embodiments described above, the developing cartridge 1 can be mounted in or removed from the drum cartridge 24. However, the developing cartridge 1 may also be integrally configured with the drum cartridge 24, for example. In this case, the process cartridge 17 integrally provided with the developing cartridge 1 and drum cartridge 24 corresponds to an example of the cartridge.

(3) The developing cartridge 1 may also be configured to have a toner box for accommodating toner such that the toner box can be mounted on or removed from a frame retaining the developing roller 4. In this case, the toner box includes the sensor unit 32 and is an example of the cartridge.

Alternatively, the developing cartridge 1 alone may be configured to be mountable in and removable from the main casing 16 retaining the photosensitive drum 25.

(4) In the first through fifth embodiments described above, the sensor gear 72 (72B, 72C) is formed of a well-known plastic and is integrally provided with the first detected protrusion 95 and second detected protrusion 96 (96B). However, the first detected protrusion 95 and second detected protrusion 96 may be provided as separate members on the sensor gear 72. In this case, the first detected protrusion 95 and second detected protrusion 96 may be formed of a resin film or an elastic member, such as rubber.

(5) In the first through fifth embodiments described above, the sensor gear 72 (or 72A, 72B, 72C) is rotatably supported on the cap 40, and the cap 40 is mounted on the left wall 33. However, the sensor gear 72 may be directly supported by the housing 2. In this case, the housing 2 possesses the sensor-gear support part 46.

(6) In the first through fifth embodiments described above, the sensor gear 72 is configured to move in the left-right direction while rotating from the initial position toward the terminal position. Instead, the sensor gear 72 may be configured to rotate without moving with respect to the left-right direction.

With the constructions according to these variations and modifications, the same operational advantages as those described above in the first through fourth embodiments can be achieved.

Incidentally, the depicted configurations according to the first through fifth embodiments, variations and modifications can also be combined appropriately depending on intended purposes and usage.

While the invention has been described in detail with reference to the embodiments thereof, it would be apparent to those skilled in the art that various changes and modifications may be made therein without departing from the scope of the invention.

What is claimed is:

1. A cartridge comprising:
   a housing configured to accommodate developer therein and having a first wall and a second wall opposing each other in a first direction defined as a direction from the second wall toward the first wall;
   an agitator gear configured to rotate about a first axis parallel to the first direction for transmitting a drive force, the agitator gear comprising:
      a first engaging portion;
      a first gear portion; and
      a second gear portion rotatable with the first gear portion and having a diameter larger than a diameter of the first gear portion, the second gear portion being positioned between the first gear portion and the first wall; and
   a detected body configured to rotate about a second axis parallel to the first axis upon receipt of the drive force from the agitator gear to move the detected body irreversibly from a first position to a second position, the first engaging portion being configured to engage the detected body at the first position upon rotation of the agitator gear, the detected body comprising:
      a detected portion;
      a detection gear portion configured to receive the drive force from the agitator gear, the detection gear portion being formed with a cutout portion; and
      a peripheral portion positioned radially outward of the detection gear portion, at least a portion of the detected portion being positioned on the peripheral portion;
   wherein the detected portion extends from the peripheral portion, and
   wherein the agitator gear and the detected body provide a such positional relationship that the first engaging portion passes between the cutout portion and the second gear portion and then engages the detected body at the first position to bring the detection gear portion into engagement with the first gear portion.

2. The cartridge as claimed in claim 1,
   wherein
   wherein the detected portion of the detected body at the second position is positioned to overlap with the first gear portion as viewed in the first direction.

3. The cartridge as claimed in claim 2,
   wherein the detected body starts to rotate at the first position and ends rotating at the second position, a distance between the detected portion and the first wall in the first direction being longer when the detected body is at the second position than at the first position; and
   wherein, the first engaging portion is positioned upstream of the first gear portion in the first direction.

4. The cartridge as claimed in claim 3,
   wherein
   wherein the detected body comprises a second engaging portion configured to engage the first engaging portion, the second engaging portion of the detected body at the first position being positioned to overlap with the second gear portion as viewed in the first direction and being positioned downstream of the second gear portion in the first direction.

5. The cartridge as claimed in claim 4,
   wherein the first gear portion has an outer peripheral surface and the second gear portion has a downstream end surface in the first direction, the first engaging portion connecting the outer peripheral surface and the downstream end surface.

6. The cartridge as claimed in claim 4,
   wherein the detected body is configured to move in a moving direction from the first position to the second position and comprises a rib extending radially,
   wherein the first wall comprises:
      a first restricting portion positioned upstream of the rib in the moving direction and configured to restrict the detected body from moving upstream in the moving direction from the first position; and
      a second restricting portion positioned downstream of the rib in the moving direction and configured to restrict the detected body from moving downstream in the moving direction from the second position, the first restricting portion and the second restricting portion extending in a circumferential direction of the agitator gear.

7. The cartridge as claimed in claim 4,
   wherein the detected portion defines a moving path while the detected body moves from the first position to the second position, the moving path having a radius of curvature larger than a radius of the second gear portion.

8. The cartridge as claimed in claim 3,
   wherein the first engaging portion defines a moving path while the agitator gear rotates; and wherein the cutout portion is positioned to overlap with the moving path of the first engaging portion as viewed in the first direction when the detected body is at the first position, the cutout portion of the detected body at the first position being configured to allow the first engaging portion to pass through the cutout portion.

9. The cartridge as claimed in claim 1,
wherein the detected body is configured to move first in the first direction and then in a second direction opposite to the first direction relative to the first wall while moving from the first position to the second position upon receipt of the drive force from the agitator gear.

10. The cartridge as claimed in claim 1,
wherein the detected body starts to rotate at the first position and ends rotating at the second position, a distance between the detected portion and the first wall in the first direction being longer when the detected body is at the second position than at the first position.

11. The cartridge as claimed in claim 10, further comprising:
a first contact portion configured to contact the detected body at the first position in the first direction; and
a second contact portion configured to contact the detected body at the second position in the first direction, the second contact portion being positioned downstream than the first contact portion in the first direction.

12. The cartridge as claimed in claim 1, further comprising:
a gear cover configured to cover the agitator gear and the detected body from a downstream side in the first direction; and
a biasing member disposed between the gear cover and the detected body in the first direction and configured to urge the detected body in a direction parallel to the first direction, the gear cover including an anchoring part for anchoring the biasing member.

13. The cartridge as claimed in claim 1, further comprising:
a gear cover configured to cover the agitator gear and the detected body from a downstream side in the first direction; and
a biasing member disposed between the gear cover and the detected body in the first direction and configured to urge the detected body in a direction parallel to the first direction, the detected body including an anchoring part for anchoring the biasing member.

* * * * *